United States Patent
Ledvina et al.

(10) Patent No.: US 10,117,046 B2
(45) Date of Patent: Oct. 30, 2018

(54) DISCRETE LOCATION CLASSIFICATION

(71) Applicant: Apple Inc., Cupertino, CA (US)

(72) Inventors: Brent M. Ledvina, San Francisco, CA (US); Robert W. Mayor, Half Moon Bay, CA (US); Lukas M. Marti, San Jose, CA (US); David R. Stites, San Jose, CA (US); Jahshan A. Bhatti, San Jose, CA (US); Kevin Duffy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/272,394

(22) Filed: Sep. 21, 2016

(65) Prior Publication Data

US 2017/0359680 A1    Dec. 14, 2017

Related U.S. Application Data

(60) Provisional application No. 62/349,013, filed on Jun. 12, 2016.

(51) Int. Cl.
*H04W 4/02* (2018.01)
*H04W 24/08* (2009.01)
(Continued)

(52) U.S. Cl.
CPC .......... *H04W 4/02* (2013.01); *G06F 17/3087* (2013.01); *H04B 17/318* (2015.01);
(Continued)

(58) Field of Classification Search
CPC ..... H04W 64/00; H04W 4/028; H04W 4/021; H04W 16/20; H04W 24/10;
(Continued)

(56) References Cited

U.S. PATENT DOCUMENTS 6,323,807 B1 * 11/2001 Golding ................. G01C 21/20
                                                          342/419
6,992,625 B1    1/2006 Krumm et al.
(Continued)

FOREIGN PATENT DOCUMENTS

WO    2016083937    6/2016

OTHER PUBLICATIONS

Bhatti et al., ""Characterizing MicroLocation Clustering Performance"", Jan. 11, 2016, 3 pages.
(Continued)

*Primary Examiner* — George Eng
*Assistant Examiner* — Umair Ahsan
(74) *Attorney, Agent, or Firm* — Kilpatrick Townsend & Stockton LLP

(57) ABSTRACT

A method for identifying a location of a mobile device is disclosed. The method includes during each of a plurality of instances of time: measuring one or more signal properties of one or more other devices across a time interval; obtaining an identifier from each of the one or more other devices; creating a data point to include the one or more signal properties; and storing the data point in a database. The method further includes analyzing the plurality data points in the database to determine clusters of data points; detecting an event at an input device of the mobile device; measuring one or more new signal properties of one or more of the plurality of other devices at one or more new times; creating a new data point from the one or more new signal properties; and identifying a first cluster corresponding to the new data point.

19 Claims, 17 Drawing Sheets

(51) Int. Cl.
   *H04W 8/00*     (2009.01)
   *G06F 17/30*    (2006.01)
   *H04B 17/318*   (2015.01)
(52) U.S. Cl.
   CPC ........... *H04W 4/023* (2013.01); *H04W 8/005* (2013.01); *H04W 24/08* (2013.01)
(58) Field of Classification Search
   CPC ..... H04W 40/244; H04W 4/02; H04W 4/023; H04W 4/025; H04W 4/04; H04W 84/12; H04W 88/02; H04B 17/318; G01C 21/20; G01C 21/206
   See application file for complete search history.

(56) References Cited

U.S. PATENT DOCUMENTS

| | | | |
|---|---|---|---|
| 7,406,116 | B2 | 7/2008 | Agrawala et al. |
| 8,620,624 | B2 | 12/2013 | Skibiski et al. |
| 8,719,198 | B2 | 5/2014 | Zheng et al. |
| 8,774,831 | B2 | 7/2014 | Ziskind et al. |
| 8,958,820 | B2 | 2/2015 | Weiss |
| 9,113,300 | B2 * | 8/2015 | Marti ............. H04W 4/021 |
| 9,253,605 | B2 * | 2/2016 | Alizadeh-Shabdiz ............. G01S 5/0278 |
| 9,274,512 | B1 * | 3/2016 | Zima ............. G05B 15/02 |
| 9,824,568 | B2 | 11/2017 | Hall et al. |
| 2013/0122935 | A1 | 5/2013 | Das et al. |
| 2013/0252637 | A1 * | 9/2013 | Cha ............. H04W 4/21 455/456.3 |
| 2013/0316734 | A1 * | 11/2013 | Weiss ............. G06Q 30/0261 455/456.1 |
| 2013/0325856 | A1 * | 12/2013 | Soto Matamala ...... H04W 4/21 707/724 |
| 2014/0171114 | A1 * | 6/2014 | Marti ............. G01C 21/10 455/456.2 |
| 2014/0213298 | A1 * | 7/2014 | Marti ............. G01S 5/0252 455/456.3 |
| 2015/0350841 | A1 * | 12/2015 | Dal Santo ............. G06F 9/54 455/456.3 |
| 2016/0165566 | A1 * | 6/2016 | Jung ............. G01S 5/0252 455/456.1 |
| 2017/0006430 | A1 | 1/2017 | Chao et al. |
| 2017/0124478 | A1 | 5/2017 | Baradaran et al. |
| 2017/0272181 | A1 * | 9/2017 | Gudi ............. H04B 17/27 |

OTHER PUBLICATIONS

Do et al., "Where and what: Using smartphones to predict next locations and applications in daily life", Pervasive and Mobile Computing, vol. 12, Jan. 1, 2014, pp. 79-91.
PCT/US2017/034664, "International Search Report and Written Opinion", dated Aug. 25, 2017, 13 pages.
PCT/US2017/034665, "International Search Report and Written Opinion", dated Aug. 30, 2017, 13 pages.
Xu et al., "Preference, Context and Communities: A Multi-faceted Approach to Predicting Smartphone App Usage Patterns", Proceedings of the 17th Annual International Symposium on International Symposium on Wearable Computers, Jan. 1, 2013, pp. 69-76.

* cited by examiner

DISCRETE LOCATION CLASSIFICATION

CROSS-REFERENCES TO RELATED APPLICATIONS

This application claims priority to U.S. Provisional Patent Application No. 62/349,013, filed on Jun. 12, 2016, and titled "Discrete Location Classification," the disclosure of which is hereby incorporated by reference in its entirety for all purposes.

BACKGROUND

Modern mobile devices (e.g., smartphones) may contain many applications. Each application may be designed to perform one or more specific functions. For instance, an application may be designed to connect a user with friends, control a television set, or inform a user of current events. As modern mobile devices become more integrated with modern day life, the number of applications stored on the mobile devices increases. It is not uncommon for modern mobile phones to have hundreds of applications. Having numerous applications may allow the mobile device to be particularly useful to the user; however, it may be difficult and time consuming for the user to find and run a desired application amongst all of the available applications.

Some modern mobile devices are capable of predicting an application to a user to minimize the time it takes for the user to find a desired application to run. For instance, some modern devices can suggest an application when the device is positioned at a location according to the device's GPS coordinates. However, using GPS coordinates to determine a location of the device limits the resolution at which the device can determine its position. Furthermore, GPS service requires an established communication line with GPS satellites. If the connection between the device and the GPS satellites is severed, the device will be unable to receive GPS coordinates and thus be unable to determine its location to predict an application to the user.

In addition to using GPS coordinates, some modern mobile devices also request an input from a user pertaining to location information. Floor plans, surveys, and the like can be entered into the device so that the device knows the general layout of an indoor location. However, inputting this information requires a survey to be performed, or requires a user to acquire a floor plan of the indoor location, which can be a hassle and difficult to do, especially when the user does not have means to perform a survey or have access to the floor plan.

Thus, improvements to determining position in indoor locations and identifying an application for a user based upon the determined position are desired.

SUMMARY

Embodiments provide improved mobile devices and methods for determining a location of a mobile device based on historical usage of the mobile device at identifiable locations using sensor measurements (sensor position), even in the absence of knowing the actual physical coordinates of the mobile device. A current relative position of a mobile device can be determined with respect to clusters of sensor positions in sensor space (i.e. space of various sensor measurements) determined from previous usage without knowing the actual physical coordinate of the mobile device.

For example, at a given physical position, a device may be configured to measure a sensor position, e.g., a set of measurements of signal intensity or time-of-flight for wireless signals from one or more signal sources, such as a wireless router. Over time, more sensor positions may be accumulated at various unknown physical positions, which may then be grouped into clusters in sensor space of known activity of the user. Thus, when a new sensor position is detected by the device, the device can compare the new sensor position with the clusters of sensor positions and determine which cluster of sensor positions corresponds to the new sensor position (e.g., is within a threshold distance away in sensor space). Knowing the location of the mobile device allows the mobile device to perform one or more actions associated with the location, such as identifying and presenting an application to the user that the user is likely to run at the location.

In some embodiments, a method for identifying a location of a mobile device that is performed by the mobile device, includes, during each of a plurality of instances of time: measuring one or more signal properties of one or more other devices across a time interval; obtaining an identifier from each of the one or more other devices; creating a data point to include the one or more signal properties, where each dimension of the data point corresponds to respective one of the one or more other devices and a value for the dimension corresponds to a signal property for that dimension; and storing the data point in a database of the mobile device, the database storing a plurality of data points corresponding to the plurality of instances of time. The method further includes analyzing the plurality data points in the database to determine clusters of data points, where different clusters of data points correspond to different locations in physical space; detecting an event at an input device of the mobile device after determining the clusters of data points; measuring one or more new signal properties of one or more of the plurality of other devices at one or more new times in response to detecting the event; creating a new data point from the one or more new signal properties; and identifying a cluster of data points corresponding to the new data point, thereby determining the location of the mobile device.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1A:
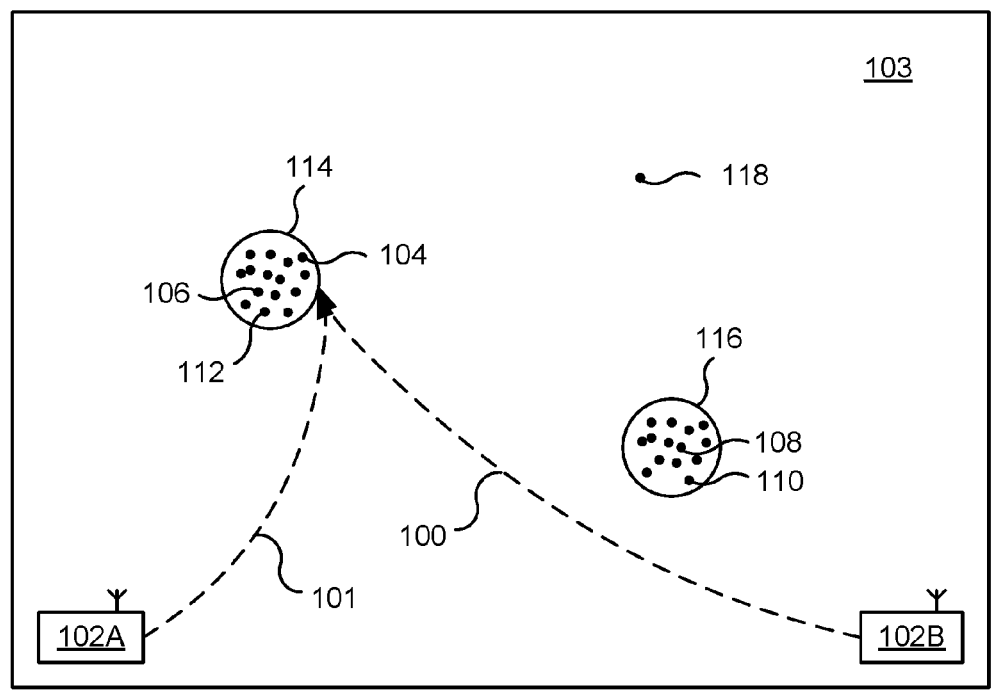
FIG. 1A is a simplified diagram illustrating clusters of physical positions in physical space according to embodiments of the present disclosure.

Accurately determining a physical location of a mobile device within a home or other building can be difficult. Embodiments provide techniques to enable making such recommendations, even when the actual coordinates of a physical location are not directly known. Sensor(s) on the mobile device (e.g., an antenna and associated circuitry) can measure sensor values from wireless signals emitted by one or more signal sources that are essentially stationary, e.g., a wireless router in the home or a network enabled appliance. These sensor values are reproducible at a same physical position of the mobile device, and thus the sensor values can be used as a proxy for physical position. In this manner, the sensor values can form a sensor position, although in sensor space, as opposed to physical space. A sensor position may be a multi-dimensional data point defined by a separate sensor value for each dimension.

A mobile device can take measurements at various unknown physical positions to obtain corresponding sensor positions, while identifying usage of applications at the various sensor positions. Measurements can be made in response to certain events occurring at an input of the mobile device, e.g., launching of an application or events that result in a backlight of a display being illuminated. After making such sensor measurements, the mobile device can generate clusters of sensor positions, e.g., periodically at night or other time of non-usage of the mobile device. Groups of sensor positions having similar sensor values may form a cluster, which can be used to define a discrete location. For each cluster, a prediction model of the mobile device can analyze the historical usage of application(s) at sensor positions within the cluster to identify predicted applications corresponding to the cluster.

After the clustering and determination by prediction model (e.g., the next day), the mobile device can measure another sensor position in response to an event detected at an input of the mobile device (e.g., indicating a user is about to use an application), and use that newly measured sensor position to identify a cluster that includes that newly measured sensor position. Once that cluster is determined, a predicted application can be identified, where the prediction may also be based on other criteria, such as time of day or the type of event that triggered the sensor measurement. A proactive action can then be taken with a predicted application. For example, a predicted application can be suggested to a user in a message (e.g., display on a screen or an audio message) or the predicted application can be automatically used to provide a message to a user, to another application on the same mobile device, or to another device.

Such a mobile device may not require the user to input survey or floor plan information to determine the device's physical location. And, the mobile device may learn of a user's pattern of device usage, and then use that learned pattern to predict applications for the user, thereby enhancing user experience.

I. Sensor Measurements and Clusters

While a mobile device is positioned at a physical location within a home or other location region, the mobile device can detect a triggering event and then measure signals emitted from one or more signal sources existing at that point in physical space. For instance, the mobile device may detect a button press, which acts as a triggering event and causes the mobile device to measure signals (e.g., WiFi or BT signals) emitted from any signal source, e.g., electronic devices, such as a wireless router, a WiFi equipped appliance (e.g., set top box, smart home device), or a Bluetooth device. The detected signals may be used to generate a multi-dimensional data point of sensor values in sensor space, where each dimension in sensor space can correspond to a property of a signal emitted from a signal source. The multi-dimensional data point may represent the sensor position of the mobile device in sensor space, where the sensor position corresponds to the physical position of the mobile device in physical space.

FIG. 1A is a simplified diagram illustrating a plurality of physical positions in physical space 103. As examples, physical space 103 can be the interior of a home, an office, a store, or other building. Physical space 103 may include a plurality of signal sources, such as signal sources 102A and 102B. Each signal source can emit wireless communication signals, as are emitted from a wireless router or a Bluetooth device. A signal source can be considered a stationary device, as their position does not typically change.

A mobile device may be located within physical space 103 such that one or more signals emitted from signal sources 102A and 102B are detected. For example, the mobile device may be located at physical position 104 in FIG. 1A, where signals 101 and 100 are detected from signal sources 102A and 102B, respectively. It is to be appreciated that the mobile device may only measure one of signals 101 and 100 at some positions, e.g., due to signal degradation at certain positions. Furthermore, the mobile device can be at a physical position where signals from other signal sources (not shown) that are outside of physical space 103 can be detected, and that embodiments herein are not limited to physical positions where the mobile device can only detect signals 101 and 100.

Typical human behavior results in the mobile device being used in some physical locations more often than other physical locations. For example, a user may use a mobile device more often when the user is on a couch or in a bed. These physical locations may be represented by clusters of physical positions, such as clusters 114 and 116 of physical positions. Each cluster may have a group of physical positions that are located close together. As an example, cluster 114 may include physical positions 104, 106, and 112. As shown, cluster 116 includes physical positions 108 and 110. According to embodiments, the mobile device may be configured to determine when the mobile device is in one of these clusters based on the detected signals (e.g., signals 100 and 101) and identify an application that is associated with the cluster.

As part of detecting signals at any of the physical positions using sensor(s) of the mobile device, the mobile device may measure one or more sensor values from signals emitted from signal sources 102A and 102B. For instance, if the mobile device is at physical position 104, the mobile device may measure sensor values from signal 101 emitted from signal source 102A and signal 100 from signal source 102B. The measured sensor values may be signal properties of signal 101 and signal 100. The measured sensor values may be used to form a sensor position in sensor space, as shown in FIG. 1B.

Figure 1B:
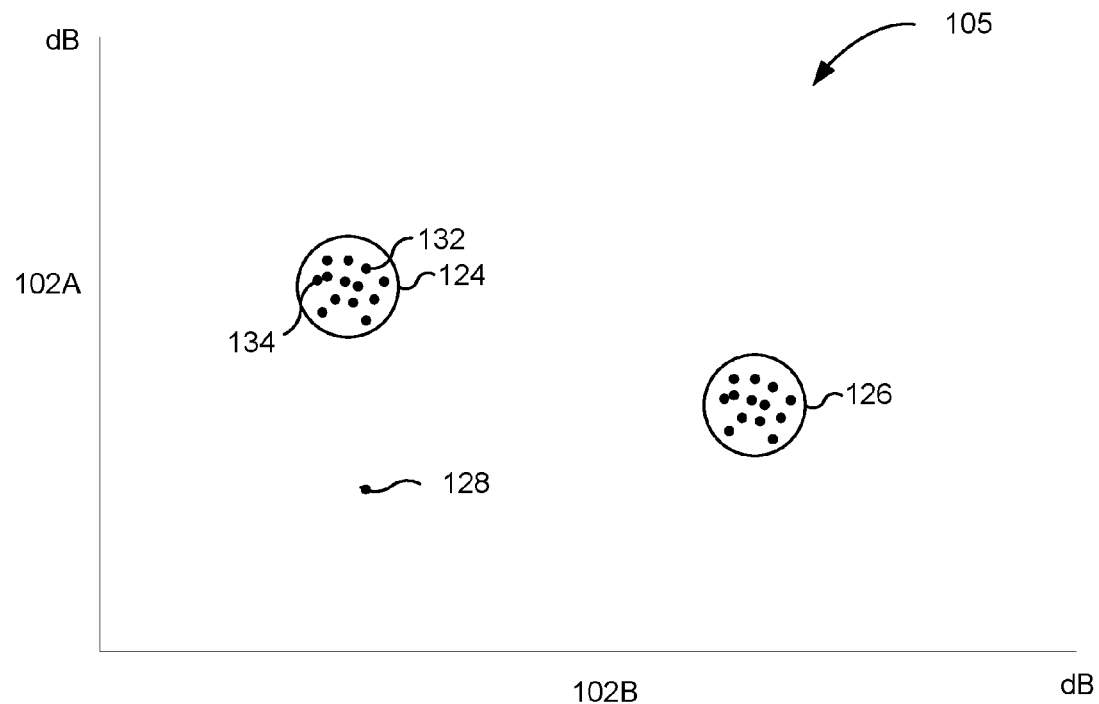
FIG. 1B is a simplified diagram illustrating clusters of sensor positions in sensor space corresponding to the physical positions in physical space of FIG. 1A according to embodiments of the present disclosure.

FIG. 1B is a simplified diagram illustrating a plurality of sensor positions in sensor space 105, which corresponds to physical space 103. Sensor space 105 is depicted as a plot of measured sensor positions in signal strength. The X axis may represent measured values of signals from signal source 102B in dB increasing to the right, and the Y axis may represent measured values of signals from signal source 102A in dB increasing upwards.

The sensor positions in sensor space correspond to respective physical positions in physical space 103. For example, measured sensor values at physical position 104 in FIG. 1A corresponds to a sensor position 132 in sensor space shown in FIG. 1B. Sensor position 132 is represented as a two-dimensional data point where one dimension corresponds to a sensor value from signal source 102A and the other dimension corresponds to a sensor value from signal source 102B. Sensor space 105 may include clusters of sensor positions, e.g., cluster 124 of sensor positions and cluster 126 of sensor positions. Clusters 124 and 126 of sensor positions correspond with clusters 114 and 116 of physical positions in FIG. 1A, respectively.

Clusters 124 and 126 may be unlabeled locations, meaning the mobile device does not know the actual physical coordinates corresponding to clusters 124 and 126. The device may only know that there exists a cluster of sensor positions that have similar sensor values and that the cluster represents a discrete location in physical space. However, the mobile device may perform functions based on sensor positions in sensor space such that use of the mobile device in physical space is benefited. For instance, the mobile device may determine a sensor position of the mobile device and suggest an application to the user based on whether the sensor position is within a cluster in which pattern of application usage is known. Method of forming clusters and suggesting an application according to a sensor position are further discussed below.

Accordingly, a sensor position can correspond to a set of one or more sensor values measured by sensor(s) of a mobile device at a physical position in physical space from one or more wireless signals emitted by one or more signal sources (e.g., external devices such as networking devices). A sensor value can be a measure of a signal property, e.g., signal strength, time-of-flight, or data conveyed in a wireless signal, as may occur if a signal source measures a signal property from the mobile device and sends that value back to the mobile device. Each sensor value of a set can correspond to a different dimension in sensor space, where the set of one or more sensor values forms a data point (e.g., a multi-dimensional data point, also called a feature vector) in the sensor space.

In the embodiment shown in FIG. 1A, sensor values for sensor positions in cluster 114 may be higher for signal source 102A (which is in the vertical axis in FIG. 1B) than the sensor values for sensor positions in cluster 116, e.g., when the sensor value is signal strength. This may be due to the fact that physical positions in cluster 114 are closer to signal source 102A than physical positions in cluster 116 are to signal source 102A. When the sensor value is a signal property of time-of-flight, the values for cluster 114 would be smaller than for cluster 116.

A given measurement of the one or more wireless signals obtained at a physical position may be made one or more times over a time interval to obtain a set of sensor value(s). Two measurements at two different times can correspond to a same sensor position, e.g., when the two measurements are made at a same physical position at the two different times. A sensor position can have a value of zero for a given dimension, e.g., sensor position if a particular wireless signal is not measured, or have a nominal value, e.g. low signal power (−100 dB RSSI) or a distance range, or have an uncertainty that is large.

II. Predicting User Interaction with a Device

The mobile device may identify which applications are run by the user at each sensor position. After collecting sensor positions and corresponding applications run by the user at the sensor positions, the device may generate clusters of sensor positions (e.g., periodically at night) and associate one or more applications that are likely to be run by the user with the clusters of sensor positions. Accordingly, when a subsequent triggering event is detected, the device may generate a new sensor position and compare the new sensor position to the generated clusters of sensor positions. If the new sensor position is determined to be within a threshold distance to one of the clusters of sensor positions, one or more applications associated with that cluster of sensor positions may be identified and used in an action, e.g., provided to the user as a suggested application. The threshold distance may be a distance represented in units of decibels (e.g., for received signal strength indication (RSSI)) or meters (e.g., for time-of-flight (TOF)), depending on the units of the sensor position, as will be discussed further herein.

A. Learning and Generating Clusters

Figure 2A:
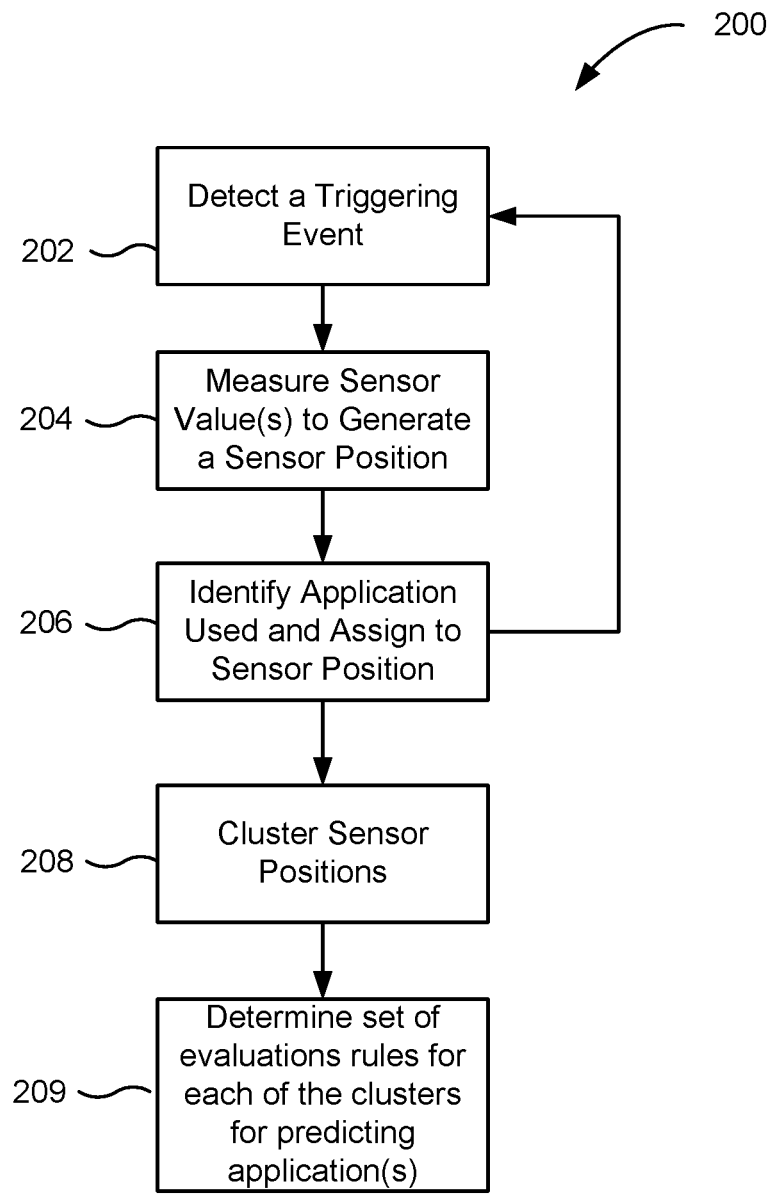
FIG. 2A is a flowchart of a method for generating clusters of sensor positions according to embodiments of the present disclosure.

FIG. 2A is a flow chart of a method 200 for generating clusters of sensor positions according to embodiments of the present disclosure. The clusters of sensor positions may be later used by a mobile device to identify and suggest an application to a user. Method 200 can be performed by a mobile device, e.g., a phone, tablet, wearable computing device, and the like.

At block 202, a triggering event is detected. A triggering event can be identified as an event sufficiently likely to correlate to an operation of the mobile device. A triggering event can be caused by a user and/or an external device. For instance, the triggering event can be a specific interaction of the user with the mobile device. The specific interaction can be used to learn what the user does at a particular position, and thus can be considered a learning triggering event. Examples of learning triggering events are application launches, specific activity within an application, voice commands (e.g., to initiate at voice assistant to perform searching or other activity with an application), and a first interaction of the day. As other examples, a triggering event can be when an accessory device is connected to the mobile device, e.g., inserting headphones into a headphone jack, making a Bluetooth connection, and the like. A list of events that are triggering events can be stored on the mobile device. Such events can be a default list and be maintained as part of an operating system, and may or may not be configurable by a user.

At block 204, one or more sensor values are measured by one or more sensors of the device to generate a sensor position (e.g., sensor position 132 in FIG. 1A) in the form of a data point (e.g., a multi-dimensional data point or a single-dimensional data point). The sensor position is measured at a physical position in physical space. The sensor values may correspond to one or more signal properties of a signal (e.g., signals 100 and 101 in FIG. 1A) emitted from one or more signal sources (e.g., signal sources 102A and 102B in FIG. 1A). For example, the sensor values may be values corresponding to signal strengths of measured signals, such as received signal strength indication (RSSI) values or any other suitable signal property whose value changes with respect to a distance of separation from a signal's point of origin. In other embodiments, the sensor values may include signal properties indicative of a distance between the device and the signal's point of origin, such as a time-of-flight (TOF) measurement value. As an example, the one or more sensors can include one or more antennas and associated circuitry to measure properties of a signal. Other examples of sensors include light sensors or audio sensors.

A signal source may be any suitable device configured to emit wireless signals. For example, a signal source may be an access point such as a wireless router, a Bluetooth device, or any other networking device suitable to transmit and/or receive signals (e.g., Bluetooth speakers, refrigerators, thermostats, home automation portals, etc.). Different signal sources can be identified based on an identifier in the signal. Each measurement from a different device can correspond to a different sensor value.

Even if a signal from only one signal source is measured, the data point representing the location can still have multiple dimensions. For example, multiple measurements can be made of signals from the same signal source, with each measurement corresponding to a different dimension of the data point (e.g. measurements of different signal properties of the signal). Additional dimensions can correspond to other devices, even if signals are not detected at a given location. Non-detected devices can have a sensor value of zero assigned, thereby still having a value for those dimensions.

At block 206, the device identifies an application used at the time the sensor value(s) are measured. The identified application may be assigned to the corresponding sensor position. A correlation between a sensor position and an application may be determined when the application is used multiple times at the sensor position or nearby sensor positions (e.g., as part of a same cluster). This correlation can be used to predict which application the user will likely use when a given sensor position is measured.

An application may correspond to any software executed on a processor of a device. For example, an application can be a client application that is executed by an operating system (e.g., electronic recipe software or software to read ebooks). As another example, an application can be software that is part of the operating system (e.g., a daemon).

Once an application has been identified, method 200 may loop back and detect an occurrence of another triggering event at block 202. In which case, method 200 may once again measure sensor values to generate a sensor position at block 204 and identify another application used at the sensor position at block 206. Blocks 202, 204, and 206 may be performed many times to gather numerous recordings of various sensor positions and the associated applications.

At block 208, the numerous recordings of various sensor positions may be analyzed to form clusters of sensor positions. The sensor positions may be analyzed at night when the user is asleep or not planning on using the mobile device for an elongated period of time, e.g., at least 4 hours. The analysis may be a batch analysis performed on a plurality of sensor positions stored from use of the mobile device across several days or weeks. A cluster of sensor positions can correspond to a group of sensor positions that are near each other in sensor space. For example, the sensor positions of a cluster can have data points that are within a threshold distance of each other or from a centroid of a cluster. Sensor positions of a cluster in sensor space would typically have their corresponding physical positions form a cluster in physical space.

As shown in FIG. 1A, physical positions 104, 106, 108, and 110 may be grouped into clusters 114 and 116 based on having similar sensor values. As an example, physical positions 104 and 106 may be grouped within cluster 114 because the sensor values for physical position 104 are within a threshold distance to the sensor values for physical position 106. Likewise, physical positions 108 and 110 may be grouped within cluster 116 because the sensor values for physical position 108 may be within a threshold distance to the sensor values for physical position 110. However, sensor values for sensor positions in cluster 114 may be different than the sensor values for sensor positions in cluster 116, thereby resulting in a separation between clusters 114 and 116. The threshold distance may be defined by typical use of the device in physical space, e.g., widths of a few feet. A threshold distance in physical space can correlate to a sensor distance based on a mapping function that can be determined via a calibration process, which may be performed by a manufacturer of the mobile device. Further details of a threshold distance can be found in concurrently filed application entitled "Determining Location of Mobile Device Using Sensor Space to Physical Space Mapping," which is incorporated by reference in its entirety.

Because the device has identified the application run by the device at the various sensor positions, one or more applications may be associated with each cluster of sensor positions. For example, if the user runs a food-related application at sensor position 132, then the food-related application may be associated with cluster 124. Cluster 124 may be associated with a physical location, such as a kitchen of a home (e.g., physical location 114). However, the device may not typically know the association between cluster 124 and the kitchen. The device may only know that cluster 124 is associated with the food-related application. Different applications may be associated with the same cluster, which may result in applications with different probabilities of being run by the user, where such probabilities can be used in determining an action to be performed with one or more of the applications, e.g., using a set of one or more evaluation rules.

At block 209, a set of one or more evaluations rules are optionally determined for each of the clusters based on historical interactions of a user with the mobile device. The evaluation rule(s) for a cluster can be determined based on how many times a particular application was run within that cluster, thereby determining which application(s) are run the most and potentially which actions are most likely to be performed by the application(s). The evaluation rules can be optionally performed once the clustering is performed so as to minimize processing time when the clusters are used as part of determining a predicted application in response to a detected event. In another embodiment, the evaluation rules can be performed at a later, e.g., when an event is detected. The determination can be made by a prediction model, as is discussed in more detail below.

B. Performing Proactive Action Based on Measured Sensor Position and Clusters

Once the clusters have been determined and potentially after a prediction model has been run, the mobile device can be used in a mode that allows a predicted application to be identified based on measured sensor values. Even while predictions are made, sensor positions and associated application can be determined on an ongoing basis, with the clustering and any updates to a prediction model being performed periodically.

Figure 2B:
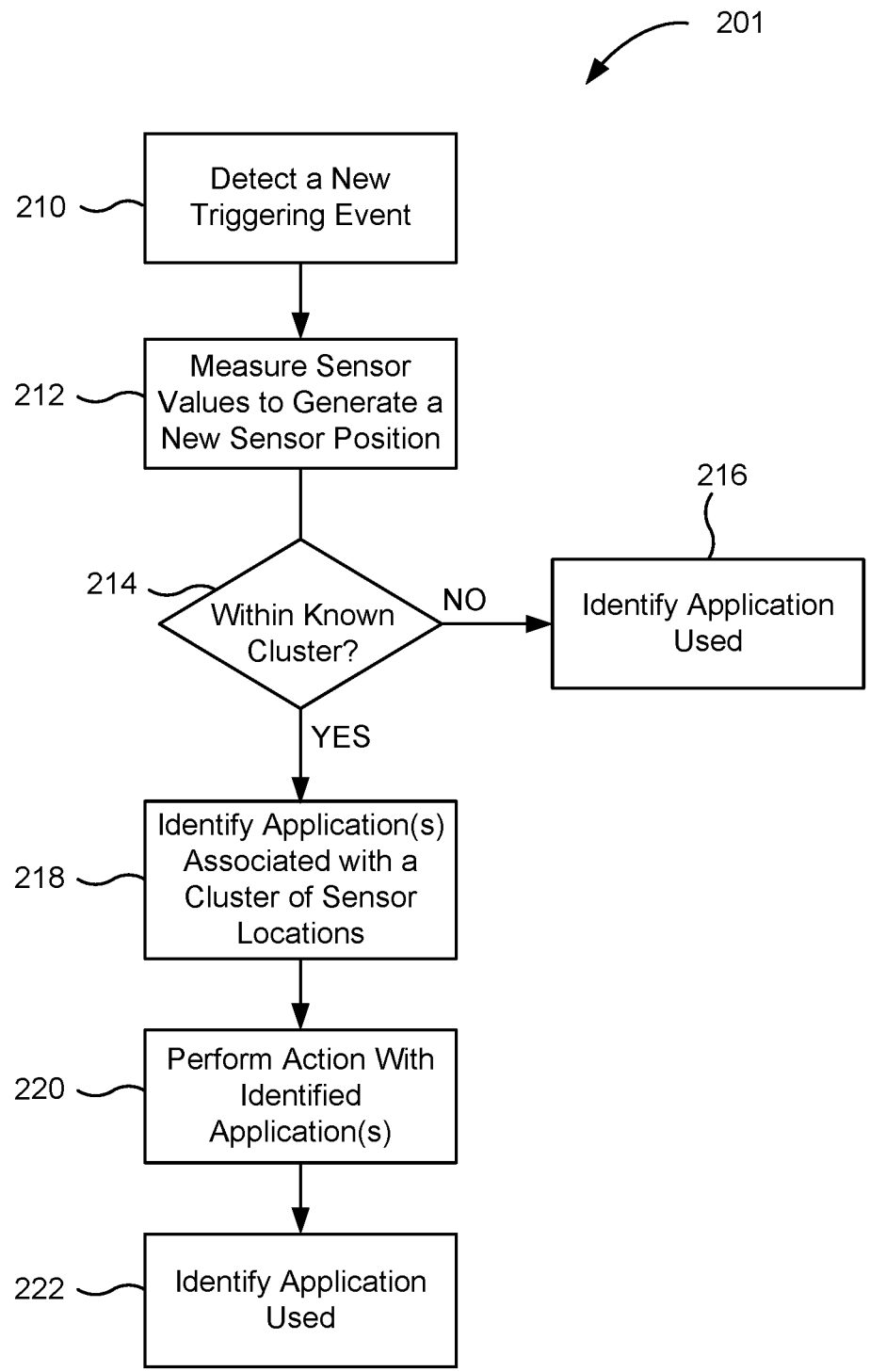
FIG. 2B is a flowchart of a method for identifying an application based upon a sensor position according to embodiments of the present disclosure.

FIG. 2B is a flow chart of a method 201 for suggesting an application to a user by referencing clusters of sensor positions according to embodiments of the present disclosure. At block 210, a new triggering event is detected. Detection of the new triggering event may be similar to the detection of the triggering event discussed with reference to block 202 in FIG. 2A, but the new triggering event may occur at a later time and a different physical position. This new physical position may be in a cluster of physical positions corresponding to a cluster of previous sensor measurements.

In some embodiments, the new triggering event is a prediction triggering event, which is used to detect when to make a prediction of action that might be taken with an application on the mobile device, as opposed to just an event to learn what the user does. As an example, the user can press a button or touch a touch-sensitive display screen to cause a backlight of the mobile device to turn on, such as pushing a home button, thereby indicating that the user intends to interact with the mobile device. In such examples, the turning on of the backlight may be the triggering event. Other examples of triggering events include the user moving around substantially while on lock screen or home screen. Some prediction triggering events can also be learning triggering events.

At block 212, one or more sensor values are measured by the mobile device to generate a new sensor position. Generating the new sensor position may also be similar to generating the sensor position discussed with reference to block 204.

At block 214, it is determined whether the new sensor position is located within a known cluster of sensor positions. The new sensor position may be determined to be within a known cluster of sensor positions if it is within a threshold distance to a centroid of the known cluster of sensor positions. If the new sensor position is not within a known cluster of sensor positions, then at block 216, an application may be identified if an application is used in conjunction with the new triggering event. For example, a sensor position 128 corresponding to physical position 118 in FIG. 1A may not be within a threshold distance to clusters 124 or 126. Thus, the mobile device may record sensor position 128 and identify the associated application run by the user at sensor position 128 for future reference. But, a specific action may not be taken, as a cluster had not been identified for that position.

If, however, the new sensor position is within a known cluster of sensor positions, then at block 218, an application corresponding to the known cluster is identified. If the new sensor position is positioned within a threshold distance to a cluster of sensor positions, then one or more applications associated with that cluster of sensor positions may be identified. The one or more applications may be determined using one or more evaluation rules that are generated at the time of measuring the sensor position or at a previous time, e.g., right after clustering.

As an example, referring back to FIG. 1A, physical position 112 may correspond with sensor position 134. Sensor position 134 may be positioned to be within a threshold distance to cluster 124. Accordingly, the application associated with cluster 124 may be identified for sensor position 134. If continuing with the example discussed with respect to block 208, the application identified for sensor position 134 may be the food-related application. As mentioned herein, the mobile device may not know that clusters 124 and 126 are associated with a physical location in a home, such as a kitchen or a bedroom. Rather, the mobile device may only know that the measured sensor positions form groups of sensor positions, as shown in FIG. 1B, and may associate each group of sensor position with a discrete location.

At block 220, an action is performed in association with the application. In an embodiment, the action may be the providing of a message including or using the identified application, such as a notification including the application. For example, the message may be a user interface that allows a user to select to run the application. The user interface may be provided in various ways, such as by displaying on a screen of the mobile device, projecting onto a surface, or providing an audio interface. A particular user interface provided to the user may depend on a degree of probability of being performed by the user. For instance, the higher the probability of use (e.g., based on higher instances of such use), more aggressive action can be taken, such as automatically opening an application with a corresponding user interface (e.g., visual or voice command), as opposed to just providing an easier mechanism to open the application (e.g., an icon on lock screen). In some implementations, if a probability is too low for any application, then no action may be taken.

The message may correspond to data in any form of communication, which may be provided to a user (e.g., displayed) or provided to another device. A message can be generated by an application or include information related to an application running on a device (e.g., include a link to an application). As examples, a message may be an alert, notification, suggested application, and the like. A message does not necessarily have to include text that conveys a readable message, as the message can be to another application, and thus the message can be in binary form.

At block 222, an application is identified. The application may be the same application identified at block 218, thereby reinforcing the identification of the application and the action taken, or a different application run by a user, e.g., even after the message is provided to the user. Thus, even if the sensor position is within a cluster, an identification can be made of an application used, as further iterations of clustering and updating of evaluation rules of a prediction model can be performed on an ongoing basis. The performance of block 222 is an example of a prediction triggering event also being used as a learning triggering event. In other embodiments, block 222 may be performed in response to a different learning triggering event (e.g., an application launch as opposed to a home button press), where the new sensor position can be re-used, as opposed to performing a new measurement.

Method 201 can enable a mobile device to accurately predict an application for a user at specific locations within a place where location information (e.g., information from GPS, Global Navigation Satellite System (GLONASS), BeiDou, Galileo, and wireless fidelity (Wi-Fi) based positioning) is nonexistent or unreliable or, where spatial resolution of existent location information is too large. As an example, method 201 can allow a mobile device to predict the food-related application when the mobile device is positioned in a kitchen of a user's home without knowing that the mobile device is positioned in the kitchen of the user's home, and can allow the mobile device to predict another application, such as a news-related application, when the mobile device is positioned in the user's bedroom without knowing that the mobile device is positioned in the bedroom of the user's home.

In another example, method 201 can allow a mobile device to send a message or a reminder to a user when the mobile device detects that it is positioned in a specific location. For instance, method 201 may allow the mobile device to send a correct meeting location when the mobile device is positioned in a wrong conference room. In another instance, method 200 may allow the mobile device to send a reminder to call a client when the mobile device enters the user's office, e.g., when the user accessed the mobile device. As such, performing method 201 enables the mobile device to be more user friendly and have a deeper connection with the user. Further details of embodiments corresponding to method 201 are discussed further herein.

III. Events Triggering Prediction

Prediction triggering events may be a predetermined set of events that trigger the identification of one or more applications to provide to a user. The events may be detected using signals generated by device components. Examples of prediction triggering events are discussed above. The description below may also apply to other triggering events.

Figure 3:
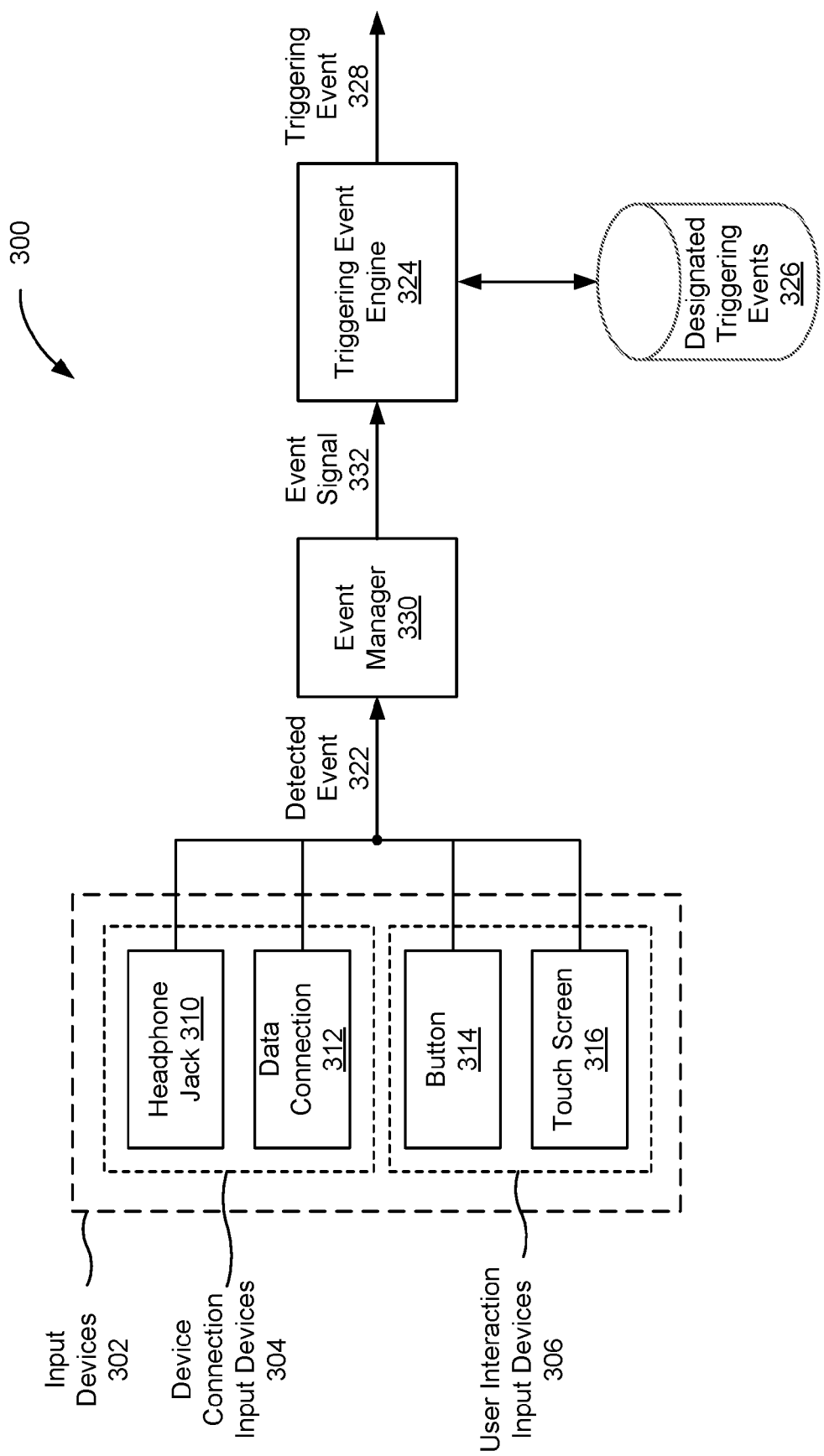
FIG. 3 shows a block diagram of a system for determining a triggering event according to embodiments of the present disclosure.

FIG. 3 illustrates a simplified block diagram of a detection system 300 for determining a triggering event according to embodiments of the present disclosure. Detection system 300 may reside within the device for which a triggering event (also just called an "event") is being determined. As shown, detection system 300 can detect a plurality of different events. One or more of the detected events may be determined by detection system 300 to be triggering events. Other processing modules can then perform processing using the triggering event.

A. Detecting Events

In embodiments, detection system 300 includes hardware and software components for detecting events. As an example, detection system 300 may include a plurality of input devices, such as input devices 302. Input devices 302 may be any suitable device capable of generating a signal in response to an event. For instance, input devices 302 may include device connection input devices 304 and user interaction input devices 306 that can detect device connection events (e.g., headphone jack, Bluetooth device, Wi-Fi connection, and the like) and user interaction events (e.g., buttons, switches, latches, touch screens, and the like), respectively. When an event is detected at an input device, the input device can send a signal indicating a particular event for further analysis.

1. User Interaction Events

User interaction input devices 306 may be utilized to detect user interaction events. User interaction events can occur when a user interacts with the device. Any suitable device component of a user interface can be used as a user interaction input device 306. A user interface can correspond to any interface for a user to generally interact with a mobile device or to interact with a specific application. Examples of suitable user interaction input devices are a button 314 and a touch screen 316. Button 314 of a mobile device may be a home button, a power button, volume button, and the like. According to embodiments, any input device that turns on a backlight of the mobile device may be a user interaction input device 306. When the user interacts with the device, it may be determined that a user has provided user input, and a corresponding user interaction event may be generated.

Touch screen 316 may allow a user to provide user input via a display screen. For instance, the user may swipe his or her finger across the display to generate a user input signal. When the user performs the action, a corresponding user interaction event is detected.

2. Device Connection Events

Device connection events may be events that occur when other devices are connected to the device. For example, device connection input devices 304 can detect events where devices are communicatively coupled to the device. Any suitable device component that forms a wired or wireless connection to an external device can be used as a device connection input device 304. Examples of device connection input device 304 include a headphone jack 310 and a data connection 312, such as a wireless connection circuit (e.g., Bluetooth, Wi-Fi, and the like) or a wired connection circuit (e.g., Ethernet and the like).

The headphone jack 310 allows a set of headphones to couple to a device. A signal can be generated when headphones are coupled, e.g., by creating an electrical connection upon insertion into headphone jack 310. In more complex embodiments, headphone jack 310 can include circuitry that provides an identification signal that identifies a type of headphone jack to the device. The event can thus be detected in various ways, and a signal can be generated and/or communicated in various ways.

Data connection 312 may communicatively couple with an external device, e.g., through a wireless connection. For instance, a Bluetooth connection may be coupled to a computer of a vehicle, or a computer of a wireless headset. Accordingly, when the external device is coupled to the mobile device via data connection 312, it may be determined that an external device is connected, and a corresponding device connection event signal may be generated.

B. Determine Triggering Events

As further illustrated in FIG. 3, input devices 302 can output a detected event 322, e.g., as a result of any of the corresponding events. Detected event 322 may include information about which input device is sending the signal for detected event 322, a subtype for a specific event (e.g., which type of button is pressed). Such information may be used to determine whether detected event 322 is a triggering event, and may be passed to later modules for determining which predictor module to use to determine which application to suggest, what message should be sent, or which action to perform.

Detected event 322 may be received by an event manager 330. Event manager 330 can receive signals from input devices 302, and determine what type of event is detected. Depending on the type of event, event manager 330 may output signals (e.g., event signal 332) to different engines. The different engines may have a subscription with the event manager 330 to receive specific event signals 332 that are important for their functions. For instance, triggering event engine 324 may be subscribed to receive event signals 332 generated in response to detected events 322 from input devices 302. Event signals 332 may correspond to the type of event determined from the detected events 322.

Triggering event engine 324 may be configured to determine whether the detected event 322 is a triggering event, and potentially the type of triggering event. To make this determination, triggering event engine 324 may reference a designated triggering events database 326, which may be coupled to the triggering event engine 324. The designated triggering events database 326 may include a list of predetermined events that are designated as triggering events, and potentially what type of triggering event each is.

Triggering event engine 324 may compare the received detected event 322 with the list of predetermined events and output a triggering event 328 if the detected event 322 matches a predetermined event listed in the designated triggering events database 326. An example of the list of predetermined events may include pressing the power button, pressing the home button, or performing any other action that turns on a backlight of the mobile device, indicating that a user wishes to interact with the mobile device to perform an action or run an application.

As described herein, one aspect of the present technology is the gathering and use of data available from various sources to suggest applications to a user. The present disclosure contemplates that in some instances, this gathered data may include personal information data that uniquely identifies or can be used to contact or locate a specific person. Such personal information data can include location-based data, home addresses, or any other identifying information.

The present disclosure recognizes that the use of such personal information data, in the present technology, can be used to the benefit of users. For example, the personal information data can be used to suggest an application that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide location information for targeted content delivery services. In yet another example, users can select to not provide precise location information, but permit the transfer of location zone information.

C. Identify Application(s) and Perform Associated Action(s)

Once a triggering event is detected, an application may be identified based on the triggering event. In some embodiments, identification of the application is not a pre-programmed action. Rather, identification of the application can be a dynamic action that may change depending on additional information. For instance, identification of the suggested application can be determined based on contextual information.

Figure 4:
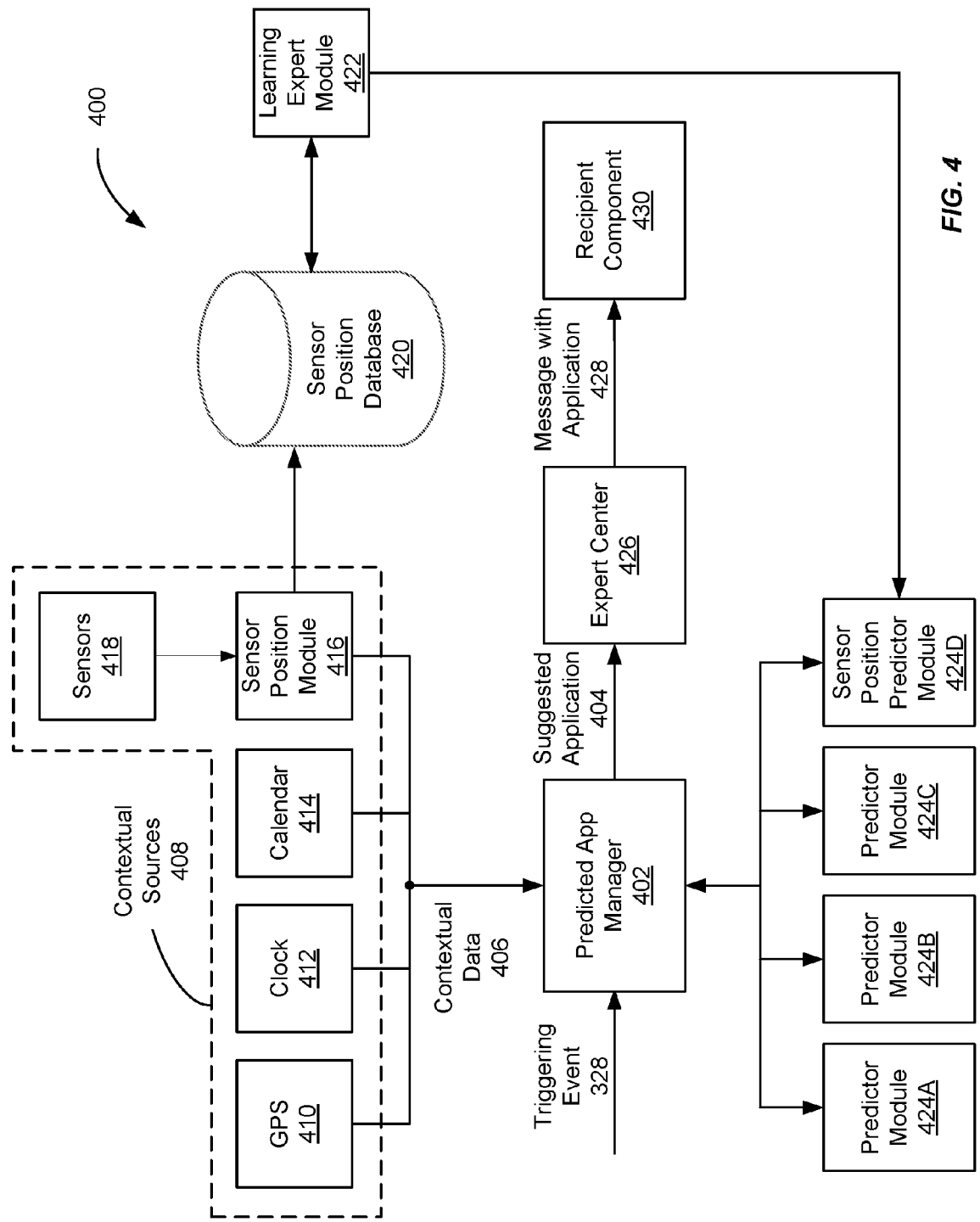
FIG. 4 shows a block diagram of a system for identifying an application for a user based on a sensor position according to embodiments of the present disclosure.

FIG. 4 illustrates a simplified block diagram of a prediction system 400 for identifying an application and a corresponding action based upon a triggering event and contextual information according to embodiments of the present disclosure. Prediction system 400 resides within the mobile device that is identifying the application. Prediction system 400 may include hardware and software components.

Prediction system 400 includes a predicted app manager 402 for identifying the suggested application. Predicted app manager 402 can receive a triggering event, such as the triggering event 328 discussed in FIG. 3. The predicted app manager 402 may use information gathered from the triggering event 328 to identify a suggested application 404. As shown, predicted app manager 402 may receive contextual data 406 in addition to the triggering event 328.

1. Contextual Information

Contextual information may be gathered from contextual data 406 and may be received at any time. For instance, contextual information may be received before and/or after the triggering event 328 is detected. Additionally, contextual information may be received during detection of the triggering event 328. Contextual information may specify one or more properties of the mobile device for a certain context. The context may be the surrounding environment (type of context) of the mobile device when the triggering event 328 is detected. For instance, contextual information may be the time of day the triggering event 328 is detected. In another example, contextual information may be a certain location of the mobile device when the triggering event 328 is detected. In yet another example, contextual information may be a certain day of year at the time the triggering event 328 is detected. Additionally, contextual information may be data gathered from a calendar. For instance, the amount of time (e.g., days or hours) between the current time and an event time. Such contextual information may provide more meaningful information about the context of the mobile device such that the predicted app manager 402 may accurately suggest an application that is likely to be used by the user in that context. Accordingly, predicted app manager 402 utilizing contextual information may more accurately suggest an application to a user than if no contextual information were utilized.

Contextual data 406 may be generated by contextual sources 408. Contextual sources 408 may be components of a mobile device that provide data relating to the current context of the mobile device. For instance, contextual sources 408 may be hardware devices and/or software code that operate as an internal digital clock 410, GPS device 412, calendar 414, and a sensor position module 416 for providing information related to time of day, location of the mobile device, and day of year, and a sensor position of the mobile device respectively. Other contextual sources may be used.

Sensor position module 416 may be software code configured to receive information from sensors 418 and write data to a sensor position database 420. In embodiments, sensor position module 416 may receive measurements of sensor values from sensors 418 and store the measured values as a sensor position in an entry in sensor position database 420. Sensors 418 may be a hardware component that is configured to detect transmission signals, such as Wi-Fi signals, Bluetooth signals, radio frequency (RF) signals, and any other type of signal capable of transmitting information wirelessly. Sensor position module 416 may be coupled to a sensor position database 420 to store the detected sensor values for future reference by a learning expert module 422, as will be discussed further herein. Sensor position module 416 may then use the measured sensor values to output a sensor position to predicted app manager 402 as contextual data.

2. Predictor Modules for Determining Recommendation

Predicted app manager 402 may then use information gathered from both the triggering event 328 and contextual data 406 to identify a suggested application 404. Predicted app manager 402 may also determine an action to be performed, e.g., how and when a message including or using suggested application 404 is provided, as may occur by a user interface be provided for a user to interact with suggested application 404.

Predicted app manager 402 may be coupled to several predictor modules 424A-424D to identify the suggested application 404. Each predictor module 424A-424D may be configured to receive information from predicted app manager 402 and output a prediction back to predicted app manager 402. The information sent to predictor modules 424A-424D may include triggering event 328 and any relevant contextual data 406, and the prediction output to predicted app manager 402 may include one or more applications and their corresponding confidence value representing how likely the user will run the application based upon the received information.

Predictor modules 424A-424D may be configured for different purposes. For instance, predictor modules 424A-242D may be configured to predict an application based on a triggering event, predict an action for controlling an accessory of a home, predict an application that is not currently installed on a mobile device that a user may be interested in, and predict an application based upon a sensor position (i.e., sensor position predictor module 424D).

Depending on which types of triggering events are detected, predicted app manager 402 may send the information to only those predictor modules. Thus, predicted app manager 402 may send information to one predictor module, a subset of predictor modules 424A-424D, or all predictor modules 424A-424D.

According to embodiments of the present disclosure, each predictor module may have a set of one or more evaluation rules for determining a prediction (e.g., application(s) and action(s)) to send to predicted app manager 402. The set of evaluation rules for sensor position predictor module 424D can comprise a list of one or more applications that correspond to a sensor position or a cluster of sensor positions, along with one or more criteria and actions to be taken for the one or more applications. An evaluation rule can select one or more applications based on the one or more criteria. For example, a likelihood (e.g., a confidence value) of each of the applications can be provided, and a criterion can be to provide the top 5 most likely applications on a screen of a user interface, where such display can comprise a message. The set of evaluation rules can further include the confidence values of the application(s) in the list. The one or more criteria can include a predetermined set of contextual information that, when measured upon detection of a triggering event, indicate which of the applications in the list that are likely to be accessed by a user In embodiments, each set of evaluation rules may be a set of strings stored in memory or compiled as part of an operating system. When predictor modules 424A-424D receive information from predicted app manager 402, predictor modules 424A-424D may compare the received information to the evaluation rules and output the predicted application and confidence that best fit the received information. As an example, sensor position predictor module 424D may have a set of evaluation rules establishing that if the sensor position is within cluster 1, then the likelihood of the user running the food-related application is at a confidence value of 90%; and if the sensor position is within cluster 2, then the likelihood of the user running the news-related application is at a confidence value of 80%.

Although the example discusses considering the sensor position of the mobile device, other contextual data 406 may also be considered to determine a predicted application and its corresponding confidence value. For instance, time of day and day of the week may also influence the prediction determined by predictor modules 424A-424D.

Once predicted app manager 402 receives the predicted application from predictor modules 424A-424D, the predicted app manager 402 may send the suggested application 404 to an expert center 426. In embodiments, the expert center 426 may be a section of code that manages what is displayed on a mobile device, e.g., on a lock screen, when a search screen is opened, or other screens. For instance, the expert center 426 may coordinate which information is displayed to a user, e.g., a suggested application, suggested contact, and/or other information. Expert center 426 can also determine how to provide such information to a user. As aforementioned herein, a particular user interface provided to the user may depend on a degree of probability of being performed by the user. The higher the probability of use, more aggressive action can be taken, such as automatically opening an application with a corresponding user interface (e.g., visual or voice command), as opposed to just providing an easier mechanism to open the application.

If the expert center 426 determines that it is an opportune time for the suggested application (or a message generated by the suggested application) to be output to the user, e.g., when the user has not yet run an application on the mobile device but is actively interacting with the mobile device, the expert center 426 may output a message 428 with suggested application 404 to a recipient component 430. Recipient component 430 may be a user interface of the mobile device itself, or a user interface of another device, such as a tablet, laptop, smart watch, smartphone, or other mobile device. As another example, recipient component 430 may be another application on the mobile device or an application of another device, where the application may be an operating system (e.g., in firmware) of the other device, as may occur when a command message is sent to another device to perform an action. In embodiments where suggested application 404 is included in message 428, recipient component 430 (e.g., a user interface) may communicate the suggested application 404 to the user and solicit a response from the user regarding the suggested application 404.

Recipient component 430 may require different levels of interaction in order for a user to run the suggested application 404. The various levels may correspond to a degree of probability that the user will run suggested application 404. For instance, if the predicted app manager 402 determines that suggested application 404 has a probability of being run by the user that is greater than a threshold probability, recipient component 430 may output a prompt that allows the user to more quickly run the application by skipping intermediate steps.

Alternatively, if predicted app manager 402 determines that the probability of the user running the identified application is less than the high threshold probability, but still higher than a lower threshold probability, the identified application may be displayed as an icon. The lower threshold probability may be higher than a baseline threshold probability. The baseline threshold probability may establish the minimum probability at which a corresponding application will be suggested. The user may thus have to perform an extra step of clicking on the icon to run the identified application. However, the number of clicks may still be less than the number of clicks required when no application is suggested to the user. The threshold probability may vary according to application type. In various embodiments, the high threshold probability may range between 75% to 100%, the lower threshold probability may range between 50% to 75%, and the baseline threshold may range between 25% to 50%. In a particular embodiment, the high threshold probability is 75%, the lower threshold probability is 50%, and the baseline probability is 25%.

In embodiments, higher probabilities may result in more aggressive application suggestions. For instance, if an application has a high probability of around 90%, predicted app manager 402 may provide an icon on a lock screen of the mobile device to allow the user to access the application with one click of the icon. If an application has an even higher probability of around 95%, predicted app manager 402 may even automatically run the suggested application for the user without having the user click anything. In such instances, predicted app manager 402 may not only output the suggested application, but also output a command specific to that application, such as a command to open the first article in the news-related application or a command to query the user to accept or decline initiating a set of predetermined actions.

According to embodiments of the present disclosure, predicted app manager 402 may determine what level of interaction is required, and then output that information to expert center 426. Expert center 426 may then send this information to recipient component 430 to output to the user.

In some embodiments, recipient component 430 may display a notice to the user on a display screen. The notice may be sent by a system notification, for instance. The notice may be a visual notice that includes pictures and/or text notifying the user of the suggested application. The notice may suggest an application to the user for the user to select and run at his or her leisure. In some embodiments, for more aggressive predictions, the notification may also include a suggested action within the suggested application. That is, a notification may inform the user of the suggested application as well as a suggested action within the suggested application. The user may thus be given the option to run the suggested application or perform the suggested action within the suggested application. As an example, a notification may inform the user that the suggested application is the news-related application and the suggested action is to access the first article within the news-related application. The user may indicate that he or she would like to read the first article by clicking on an icon indicating the first article. Alternatively, the user may indicate that he or she would rather run the application to read another article by swiping the notification across the screen.

In embodiments, the mobile device may identify what application is run at a sensor position, and then draw an association between the sensor position and the application. The application may be stored in sensor position database 420 along with the corresponding sensor position. In embodiments, sensor position database 420 may store sensor position data during a certain period of time. As an example, sensor position database 420 may store sensor position data measured during the last seven weeks. Knowing which application is run at the sensor position helps evaluate the user's habits to update the evaluation rules stored in sensor position predictor module 424D for use in predicting applications in line with the user's habits. In some embodiments, an expert module can routinely update predictor modules 424A-424D.

3. Updating Controllers for Determining Recommendation

As shown in FIG. 4, a learning expert module 422 is coupled to sensor position database 420 and sensor position predictor module 424D. Learning expert module 422 may be configured to update a set of evaluation rules contained in sensor position predictor module 424D. Although FIG. 4 only shows one learning expert for updating one predictor module, embodiments are not so limited. For instance, learning expert module 422 can also be configured to update any of predictor modules 424A-424C. In other instances, additional learning experts may be implemented in prediction system 400 for updating predictor modules 424A-424C.

Learning expert module 422 may be a software module configured to access sensor position database 420 and analyze its stored information to generate an updated set of evaluation rules for sensor position predictor module 424D. Learning expert module 422 may include one or more prediction models (not shown). Each prediction model may be a section of code and/or data that is specifically designed to identify an application for a specific triggering event. For instance, one prediction model may be specifically designed to identify an application for a triggering event associated with a turning on of a backlight of the mobile device. Each prediction model may be coupled to the contextual sources so that each prediction model may utilize contextual information to identify a suggested application. Examples of prediction models include neural networks, decision trees, multi-label logistic regression, and combinations thereof, and other types of supervised learning. Further details can be found in U.S. patent application Ser. Nos. 14/732,359 and 14/732,287, which are incorporated by reference in their entirety.

As mentioned herein, sensor position database 420 may store sensor position data for a specific period of time, e.g., the past seven weeks of use. Thus, the updated set of evaluation rules generated by learning expert module 422 for sensor position predictor module 424D may reflect the pattern of device usage across the past seven weeks. According to embodiments, once learning expert module 422 has generated an updated set of evaluation rules, learning expert module 422 may be deleted and removed from memory. Next time the sensor position predictor module 424D is updated, learning expert module 422 may be initiated again to generate an updated set of evaluation rules and then deleted once again. Deleting learning expert module 422 after generating an updated set of evaluation rules saves memory space and increases device performance.

In embodiments, learning expert module 422 may be periodically run. The time at which learning expert module 422 is run may depend on the availability of the mobile device and the likelihood of being used by the user. As an example, learning expert module 422 may be run every night when the user is asleep, e.g., after sensor position module determines clusters of sensor positions. In such instances, the mobile device is typically connected to a power source to charge its battery and the user is not likely to access the mobile device and interrupt the operations of learning expert module 422.

IV. Dual Level Resolution for Determining Location

According to embodiments of the present disclosure, predicting an application based on a sensor position may be a dual level procedure. The first level may be performed to determine a general location (also called a location region) of the mobile device, and the second level may be performed to determine a more specific location within the general location of the mobile device. The dual level procedure may be performed upon detection of a predetermined triggering event that is indicative of the need for determining higher spatial resolution. The dual level resolution performed by embodiments discussed herein can ensure that the mobile device performance costs associated with determining a sensor position are not wasted on locations that do not need a finer resolution for determining location.

Figure 5:
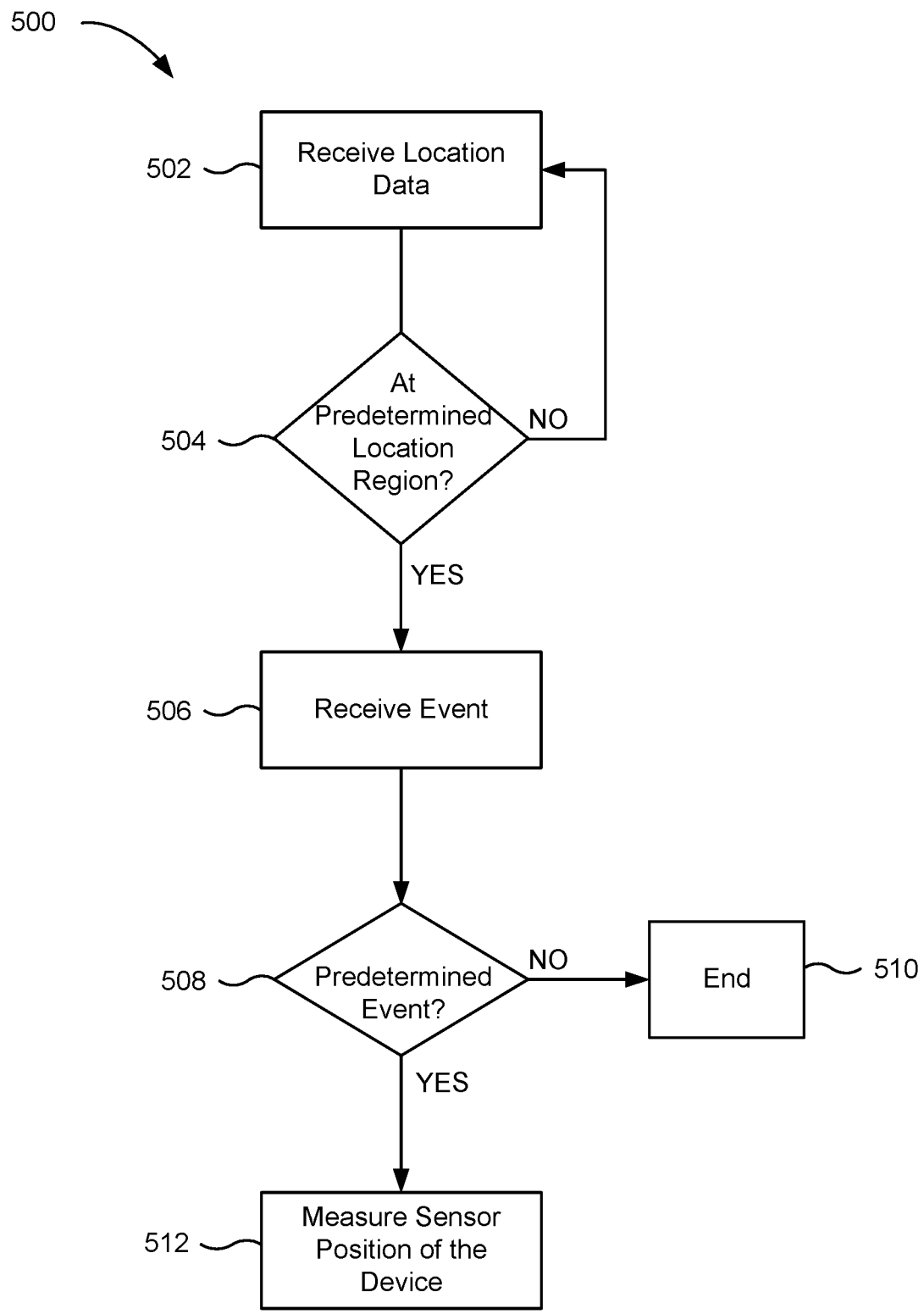
FIG. 5 is a flowchart of a method for a dual resolution process for determining a sensor position according to embodiments of the present disclosure.

FIG. 5 is a flow chart of a method 500 for performing dual level resolution according to embodiments of the present disclosure. Method 500 can be performed by a mobile device, e.g., a phone, tablet, and the like. For ease of understanding, the discussion of FIG. 5 periodically references FIG. 6, which illustrates an exemplary geographical environment containing general locations and sensor positions that are related to the discussion of FIG. 5. That way, a visual representation of method 500 can be observed in FIG. 6 to aid in the discussion of FIG. 5.

Figure 6:
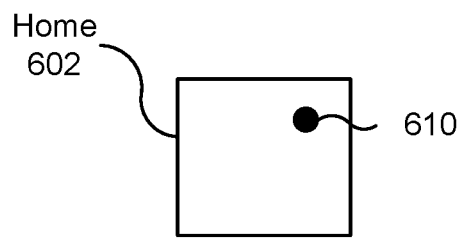
FIG. 6 is a simplified diagram illustrating a dual resolution process for determining a sensor position according to embodiments of the present disclosure.
Figure 6:
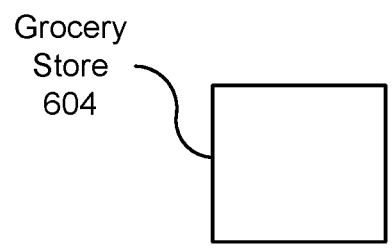
Figure 6:
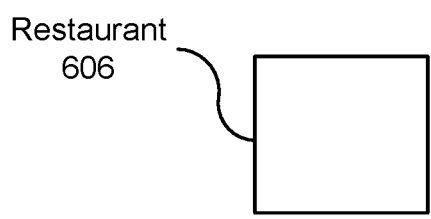
Figure 6:
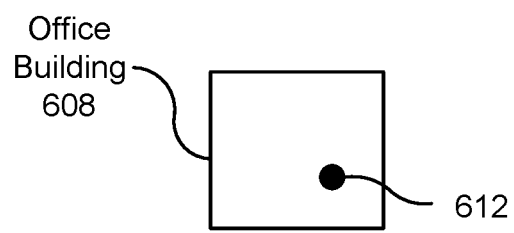

At block 502, location data (e.g., GPS data) is received to determine a general location of the mobile device. Location data may include coordinates of latitude and longitude that represent a geographical location. The mobile device may use the location data to determine the general location of the mobile device. For example, as shown in FIG. 6, the mobile device may use the location data to identify any one of general locations 602, 604, 606, and 608. Each general location may represent a location where a user may travel. For example, general location 602 may be the user's home, general location 604 may be a grocery store at which the user may buy produce, general location 606 may be a restaurant at which the user may eat dinner, and general location 608 may be an office building at which the user may work. The location data may be used to determine whether the mobile device is at any one of these locations upon detection of the triggering event.

At block 504, it is determined whether the mobile device is at a predetermined location region. For example, the coordinates of latitude and longitude of the mobile device can be compared with a list of predetermined location regions that includes the first location region, and it can be determined that the coordinates of latitude and longitude lie within the first location region.

A predetermined location region may be determined to be a specific region within which a user spends a sufficient amount of time (e.g., 10 minutes). The predetermined location region may be a general location where the user may be likely to initiate or utilize distinct functions of the mobile device at different locations within the general location, and thus require finer spatial resolution. As an example, a predetermined location region may be a user's home where the user may perform device functions at different locations within the user's home. For instance, the user may access the food-related application when the user is in the kitchen, or the user may access the news-related application when the user is in the bedroom. In an instance where the general location is the user's workplace, the user may want a notification sent to the user when the user is in the wrong conference room, or the user may want a notification to call his client when he steps in his office. Accordingly, some exemplary predetermined location regions may be the user's home (general location 602 in FIG. 6) and the user's workplace (general location 608 in FIG. 6).

To enable the mobile device to predict what applications to suggest to the user at those different locations within the general location, the mobile device may need to determine a sensor position of the mobile device. If it is determined that the mobile device is not at a predetermined location region, then method 500 may return to block 502 to receive location data (now at a later time) and determine whether the device has moved to a predetermined location. However, if it is determined that the mobile device is at a predetermined location region, then method 500 may continue to block 506 to where the mobile device may attempt to detect a triggering event.

At block 506, an event is received. As an example, a triggering event associated with turning on a backlight of the mobile device may be detected, as discussed with respect to FIG. 3. Other triggering events such as an insertion of headphones into a headphone jack or establishing a connection with an external Bluetooth device may also be detected.

At block 508, it is determined whether the event received at block 506 is a predetermined event, e.g., learning triggering events or prediction triggering events. Both triggering events can cause sensor values to be measured when the mobile device is at a predetermined location. Learning triggering events may include, but are not limited to, actions related to launching applications, invoking a voice-controlled service on the phone (e.g., Apple Siri™), first-wake-of-the-day (e.g., interacting with the phone after an elongated period of time has elapsed), establishing Bluetooth or connections, or any other related triggering event, such as interacting with a specialized accessory connected with the mobile device (e.g., Apple HomeKit™). If the event is not a predetermined event, method 500 can end at block 510.

One example of a prediction triggering event is turning on the backlight of a mobile device, as can occur upon an initial interaction by a user. Turning on the backlight of a mobile device is a triggering event that often occurs when the user would like to access a particular application, but has not accessed the application yet). Other prediction triggering events include button presses that open the home screen and substantial movement of the mobile device, e.g., the mobile device has moved a certain distance, as may be measured by one or more sensors, such as an accelerometer and a gyrometer.

At block 512, the mobile device may measure a sensor position of the mobile device when the triggering event is a predetermined event. The sensor position may correspond to a physical position within the general location, but at a finer resolution than what can be achieved with the location data.

As an example, in FIG. 6, the mobile device may determine a sensor position 610 within the user's home (general location 602) when a triggering event is detected. Sensor position 610 may correspond to a location in the kitchen or in the bedroom. Likewise, the mobile device may determine a sensor position 612 within the user's workplace (general location 608) when a triggering event is detected at a different instance in time. Sensor position 612 may correspond to the user's office or a conference room.

V. Sensor Positions and Sensor Clusters

According to embodiments of the present disclosure, a mobile device may determine a sensor position within a general location. The sensor position may be a position in space represented by sensor values measured from wireless signals emitted from signal sources. When many sensor positions are recorded, the mobile device may recognize a distribution of sensor positions that form clusters of sensor positions represented by groups of sensor positions having similar sensor values. The clusters of sensor positions may be used to predict applications and determine actions associated with those applications, as discussed herein.

Figure 7A:
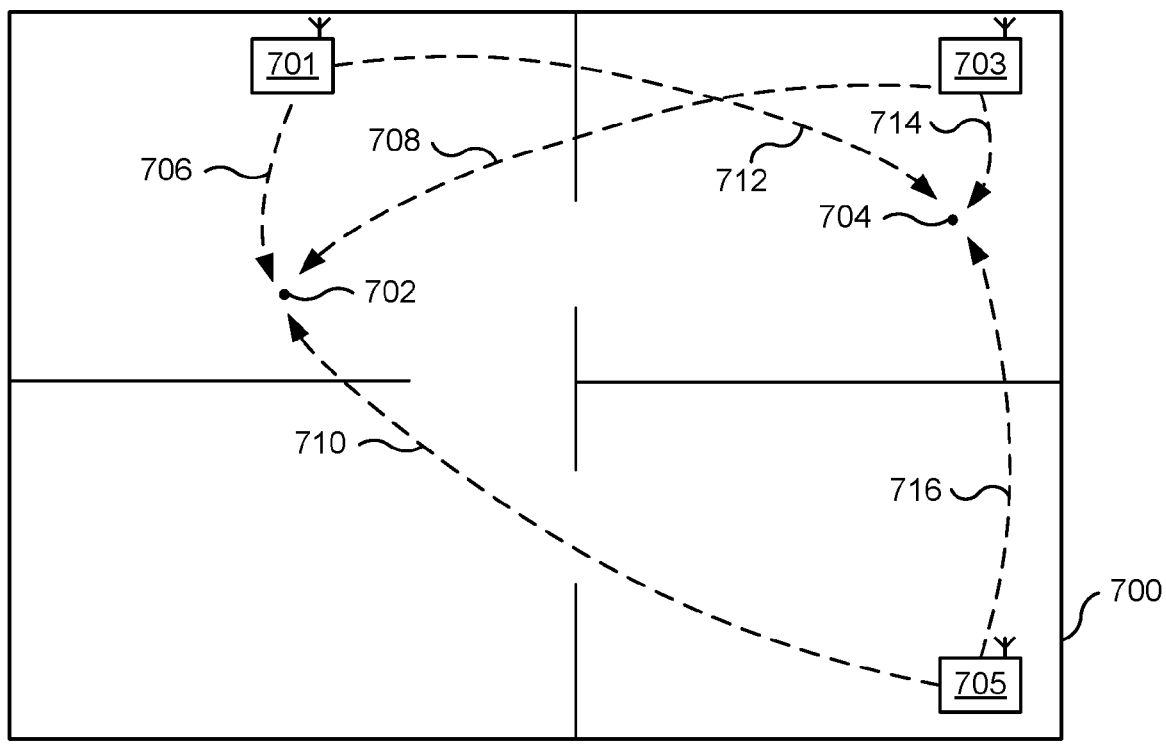
FIG. 7A is a simplified diagram illustrating measurement of sensor positions in a floor plan according to embodiments of the present disclosure.

FIG. 7A is a simplified diagram illustrating an exemplary floor plan 700 within which sensor positions are measured. One or more signal sources 701, 703, and 705 may be positioned within floor plan 700. Each signal source may be a device configured to emit wireless signals. For example, a signal source may be an access point (AP) such as a wireless router, a Bluetooth device, or any other communication device suitable to transmit and/or receive signals. Signal sources may be distinguishable from cell towers that provide telecommunication services to mobile devices in that signal sources are lower powered devices that provide wireless data transfer across a smaller range intended for a smaller user base.

The sensor values measured by the mobile device may be properties of signals emitted from the signal sources. In some embodiments, the sensor values may be values corresponding to signal strengths of measured signals, such as received signal strength indication (RSSI) values or any other suitable signal property that changes with respect to distance from a signal's point of origin. In other embodiments, the signal values may be a signal indicative of a distance between the mobile device and the signal's point of origin, such as a time-of-flight (TOF) measurement value. Exemplary TOF measurements include round trip time (RTT) and one-way ranging measurements. One-way ranging measurements may be performed by synchronizing a clock of the mobile device with a clock of a signal source using IEEE 1588 or its equivalent and then using one-way ranging (e.g., via radio waves such as Wi-Fi, ultra wideband, or radar, or sound waves) to compute a TOF measurement value. As other example of synchronization, both devices can contain GPS receivers that are synchronized to GPS time. Both devices can be synchronized via some other means than the ranging waveforms. For example, the synchronization could be done with Wi-Fi waveforms that are not designed for ranging or with Wi-Fi waveforms that are in a different frequency band. Synchronization could also be done with ultra-wide-band (UWB) signals. As a further example, both devices contain atomic clocks that are high quality, which would need to be synchronized but not very often. The synchronization may be at 10 nanoseconds or better.

Although FIG. 7A illustrates floor plan 700 as having only three signal sources 701, 703, and 705, embodiments are not limited to such configurations. Other embodiments may have more or less signal sources. For instance, embodiments may have floor plans that include ten signal sources. Moreover, although FIG. 7A illustrates signal sources positioned within floor plan 700, other embodiments may have one or more signal sources positioned outside of floor plan 700. As an example, one or more signal sources may be located in a neighbor's home or office outside of floor plan 700. In another example, one or more signal sources may be located in a floor above or below floor plan 700 in a multi-storied building. It is to be appreciated that signal sources may be located in any position from which wireless signals emitted may be measured by a mobile device according to embodiments of the present disclosure.

A. Measurement of Sensor Position

Within floor plan 700, a plurality of sensor positions may be measured by the same mobile device. For instance, as shown in FIG. 7A, sensor values may be measured at a physical position 702 by the mobile device at time T0, and other sensor values may be measured at a physical position 704 by the mobile device at time T1, where T0 and T1 are not equal. The mobile device may be at physical position 702 in the afternoon when the mobile device is determining its sensor position upon detecting a first triggering event, and the mobile device may be at physical position 704 in the evening when the mobile device is determining its sensor position upon detecting a second triggering event.

Physical position 702 may be defined by a sensor position containing sensor values measured from signals emitted from signal sources 701, 703, and 705. The sensor values may represent one or more signal properties of the signals emitted from signal sources 701, 703, and 705. As shown in FIG. 7A, physical position 702 may be defined by properties of signals 706, 708, and 710 measured from signal sources 701, 703, and 705, respectively. Similarly, physical position 704 may be defined by properties of signals 712, 714, and 716 measured from signal sources 701, 703, and 705, respectively. In embodiments, the sensor values may be an RSSI and/or a TOF (e.g., RTT) of signals emitted from signal sources 701, 703, and 705.

In addition to the sensor values, the mobile device may also receive and record an identification (ID) of the signal source. The signal source ID may be any suitable form of identification for the signal source, such as a media access control (MAC) address, internet protocol (IP) address, and the like. The identification of the signal source may be appended to a respective sensor value, such that the mobile device may identify which signal source emitted the measured signal. Other information may also be appended to the measured sensor value. For example, information representing a time interval across which the sensor value was measured may also be appended to the measured sensor value.

According to embodiments, the sensor values may be measured by sensors in the mobile device. For instance, sensor 418 discussed herein with respect to FIG. 4 may measure signals 706, 708, and 710 emitted from signal sources 701, 703, and 705. Once the signals are measured, sensor 418 may send the data to sensor position module 416 to generate a sensor position corresponding to physical position 702. In embodiments, the sensor position may be a multi-dimensional data point, which may be represented as a feature vector $x_k$ containing measured signal properties.

The feature vector $x_k$ may be defined as:

$$x_k = \begin{bmatrix} RSSI_k^1 \\ RSSI_k^2 \\ \vdots \\ RSSI_k^M \\ RTT_k^1 \\ RTT_k^2 \\ \vdots \\ RTT_k^N \end{bmatrix}$$

for M number of RSSI values and N number of RTT values, where each integer of M and N corresponds with an identifier of a source signal (e.g., media access control (MAC) address, universally unique identifier (UUID), truncated UUID, Bluetooth device address, or an IP address of an access point) for the associated sensor value, and where k represents a time interval across which the signal value was measured. It is to be appreciated that one or more RSSI and RTT values may be measured from the same signal source and thus have the same MAC address. Although feature vector $x_k$ includes RSSI and RTT sensor values, other embodiments where feature vector $x_k$ includes other types of sensor values for determining a sensor position without departing from the spirit and scope of the present disclosure are envisioned herein as well.

B. Creating a Multi-Dimensional Data Point

To create a multi-dimensional data point, sensor values may be measured and then stored in a database, such as sensor position database 420 in FIG. 4. In some instances, a filtering step may be performed to avoid storing sensor value measurements that may be distorted or unreliable. Various steps of creating a multi-dimensional data point are discussed further herein. Aspects of the discussion also apply when only one sensor values is measured for a data point corresponding to a sensor position.

1. Data Measuring

Figure 7B:
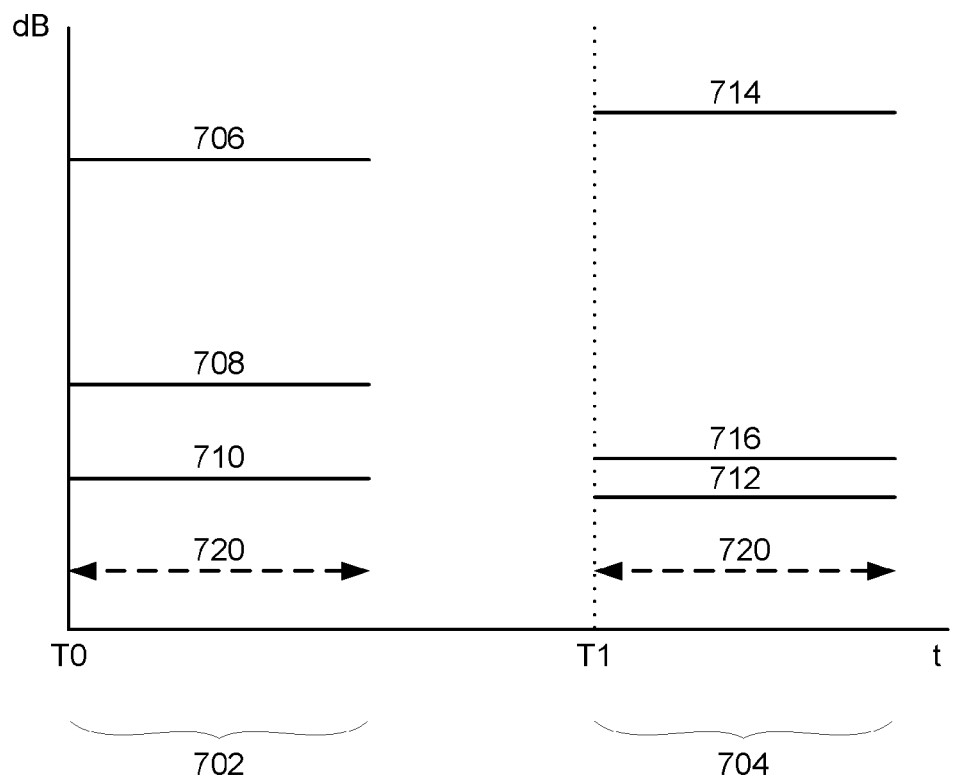
FIG. 7B is a chart representing sensor measurements for determining a sensor position according to embodiments of the present disclosure.

In embodiments, multiple sensor values may be measured across a predetermined time interval to create a multi-dimensional data point. FIG. 7B is a chart illustrating an exemplary measurement of sensor values (e.g., RSSI signal values) at physical positions 702 and 704 at time T0 and T1, respectively, across a time interval 720. The vertical axis may represent signal strength in decibels (dB) and the horizontal axis may represent time (t).

T0 may be an instance in time where a triggering event is detected and causes the mobile device to measure its sensor position. At time T0, sensor values may begin to be measured for signals 706, 708, and 710 at physical position 702. The sensor values may be measured for a duration of time interval 720. In some embodiments, multiple measurements of signals 706, 708, and 710 may be made across time interval 720. Time interval 720 may be an amount of time that is long enough for the mobile device to accurately measure a sensor value but not too long where an unnecessary amount of power is being drawn from a power source, such as a battery. In some embodiments, predetermined time interval 720 is less than one second.

Sometime after T0, the mobile device may detect another triggering event and begin to measure its sensor position again at time T1, where the mobile device has since moved to physical position 704. At that time, the mobile device may measure sensor values of signals 712, 714, and 716 from signal sources 701, 703, and 705, respectively, across time interval 720.

As shown in FIG. 7B, some sensor values may have higher dB levels than other signals at each sensor position. This may be because signal strength is inversely proportional to the distance of separation between a sensor and a signal's point of origin (e.g., signal source), meaning shorter distances of separation may result in higher signal strengths. Thus, each sensor position may have its own distinctive arrangement of signal strengths. Furthermore, depending on the location of the mobile device when sensor values are measured, the mobile device may not detect some signals emitted from certain signal sources. Accordingly, each sensor position may include sensor values from a unique set of signal sources. As a result, some sensor positions may have different sensor values, and other sensor positions may have similar sensor values. These similarities and differences in signal strengths and arrangements of signals sources may be analyzed to determine clusters of sensor positions having similar properties.

Measuring sensor values across a predetermined time interval may create a trend of sensor values. For example, as shown in FIG. 7B, each sensor value measured at physical position 702 and physical position 704 may have a substantially horizontal trend of sensor values. Having a horizontal trend indicates that the mobile device was not substantially moving during measuring of sensor values. Thus, horizontal trends may indicate accurate sensor value measurements. If the trend of sensor values are not substantially horizontal, then this may indicate that the mobile device has substantially moved during measurement of the sensor values and thus is an inaccurate measurement that should be filtered out. Such a filtering process can be performed for other signal properties than the signal strength shown in FIG. 7B, such as TOF measurements.

2. Data Filtering

Figure 8A:
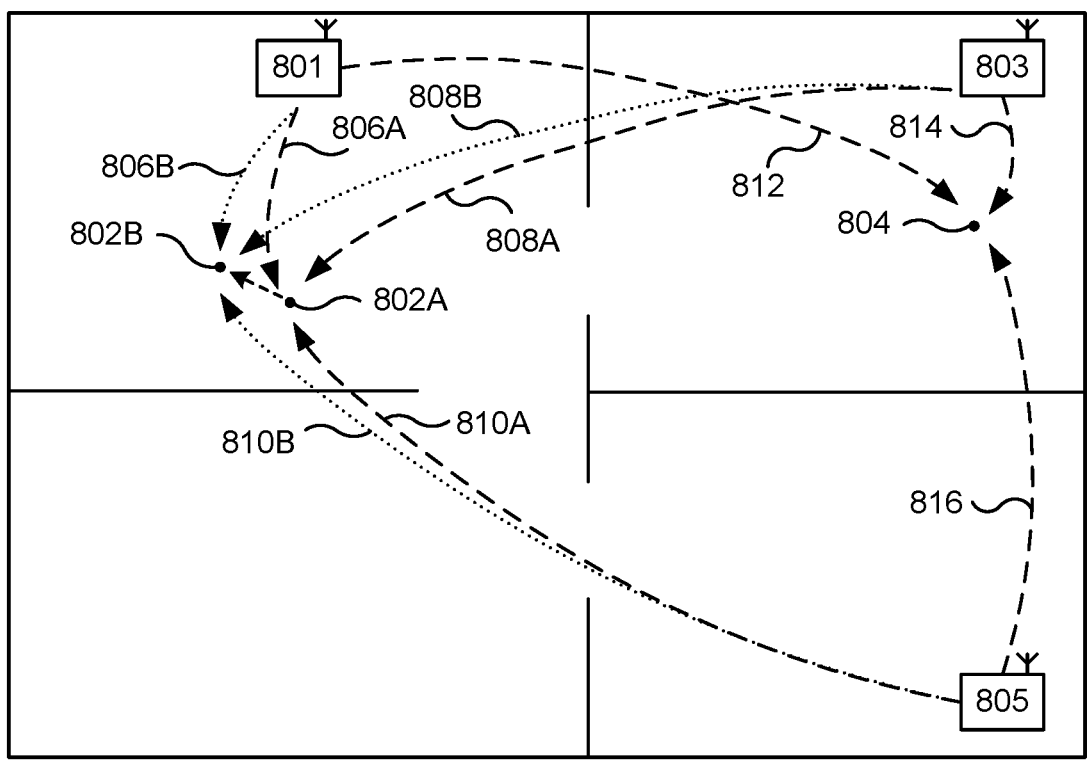
FIG. 8A is a simplified diagram illustrating measurement of sensor values in a floor plan when a device has moved according to embodiments of the present disclosure.
Figure 8B:
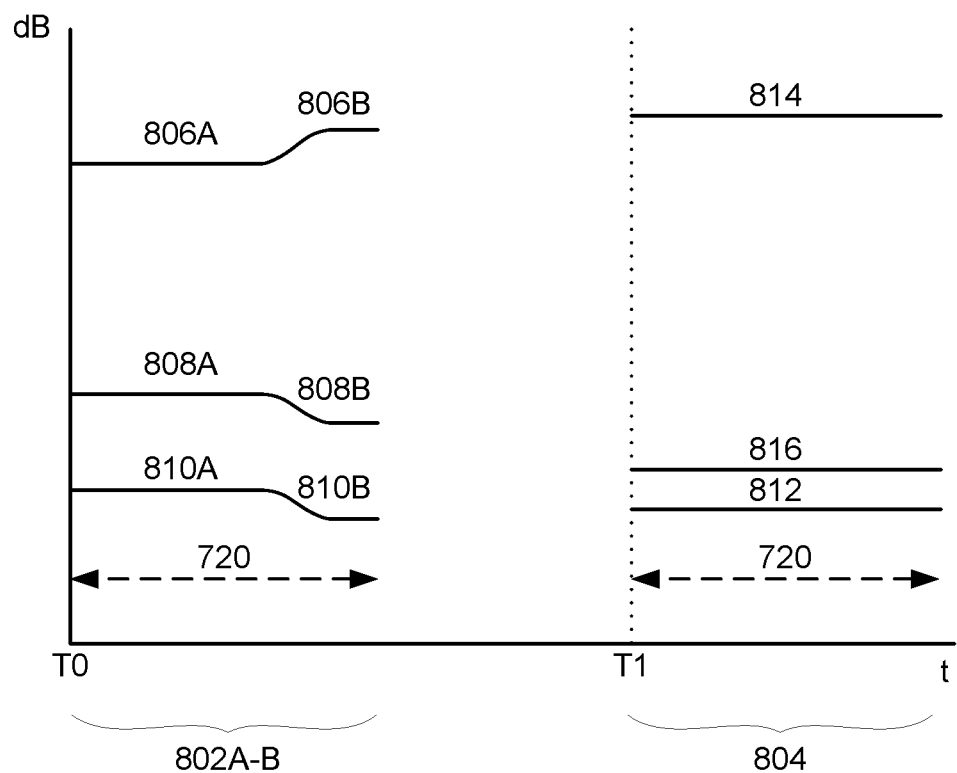
FIG. 8B is a chart representing sensor measurements for determining a sensor position when a device has moved according to embodiments of the present disclosure.

FIGS. 8A and 8B illustrate a situation where measurement results in trends of sensor values that are not substantially horizontal. As shown in FIG. 8A, a mobile device may move from physical position 802A to physical position 802B during measurement of sensor values for a time interval corresponding to sensor position. As a result, the trend for each sensor value may increase or decrease as shown in the chart illustrated in FIG. 8B.

At time T0, measured sensor values at physical position 802A may be substantially horizontal for signals 806A, 808A, and 810A from signal sources 801, 803, and 805 until a time at which the mobile device moves to physical position 802B before time interval 720 has expired. After moving to physical position 802B, certain measured sensor values may increase or decrease to measured sensor values of signals 806B, 808B, and 810B. The change in the trend of the sensor values may cause the mobile device to not record the single sensor position that includes the sensor values at 802A and 802B. In some embodiments, a change in measured sensor values greater than a threshold value may be filtered out (e.g., not saved). This is in contrast to sensor values measured of signals 812, 814, and 816 when the mobile device is at physical position 804, where the sensor values are stable. In some embodiments, when the measured sensor values are stable, such values can be compressed, e.g., some values dropped or an average taken. Such a process can remove redundant information, thereby limiting storage space and reduce computation due to a sensor space with fewer dimensions.

3. Data Storing

Once the multi-dimensional data point has been generated, the multi-dimensional data point may be stored. As an example, the multi-dimensional data point may be stored in a database, such as sensor position database 420 in FIG. 4. Sensor position database 420 may store numerous other multi-dimensional data points generated over a period of time. As an example, sensor position database 420 may store multi-dimensional data points generated from the most recent seven weeks of time. Multi-dimensional data points generated from more or less than seven weeks of time may be stored in other embodiments. The amount of data points may depend on the mobile device's storage, processing time, memory capacity, and/or privacy policy. The multi-dimensional data points stored within sensor position database 420 may be accessed to build a cluster model for predicting applications, as discussed herein.

C. Building Cluster Model

A cluster model may be built from the multi-dimensional data points in the database. A process, such as learning expert module 422 in FIG. 4, may analyze the multi-dimensional data points and determine whether there are groups of multi-dimensional data points that have similar sensor values. Multi-dimensional data points having similar sensor values may indicate that these multi-dimensional data points are close in proximity to one another.

In embodiments, multi-dimensional data points may be determined to be similar to one another when they are within a threshold distance of each other. The threshold distance may be a distance in sensor space, meaning a distance represented in units of decibels (dB). In other embodiments, the threshold distance may be a distance in physical space (e.g., when a mapping function is used to transform sensor distance to physical distance), and thus represented in units of physical distance, e.g., meters.

The units of the threshold distance may be dependent upon the units of the measured sensor positions. For instance, if the sensor position is in units of dB or meters, then the threshold distance may also be represented in units of dB or meters, respectively. If the sensor position is in units of dB and meters (e.g., when some measured values are from RSSI measurements and some are from TOF measurements), then two threshold distances may be respectively used in units of dB and meters. Thus, the sensor position can be broken up into two separate measurements, one in dB and one in meters, thereby effectively providing two positions, both of which can be required to satisfy their respective threshold distance. In other embodiments, each distance along one dimension can be determined as a unitless quantity by normalization, e.g., using a maximum value for that dimension. In this manner, the separate sensor value for dB and meters can be combined into a single distance value that can be compared to a single threshold distance. Accordingly, the threshold distance may be normalized into a different set of units. Typical values for the threshold distance in sensor space may range between 6-10 dB when signal strength is used.

Figure 9A:
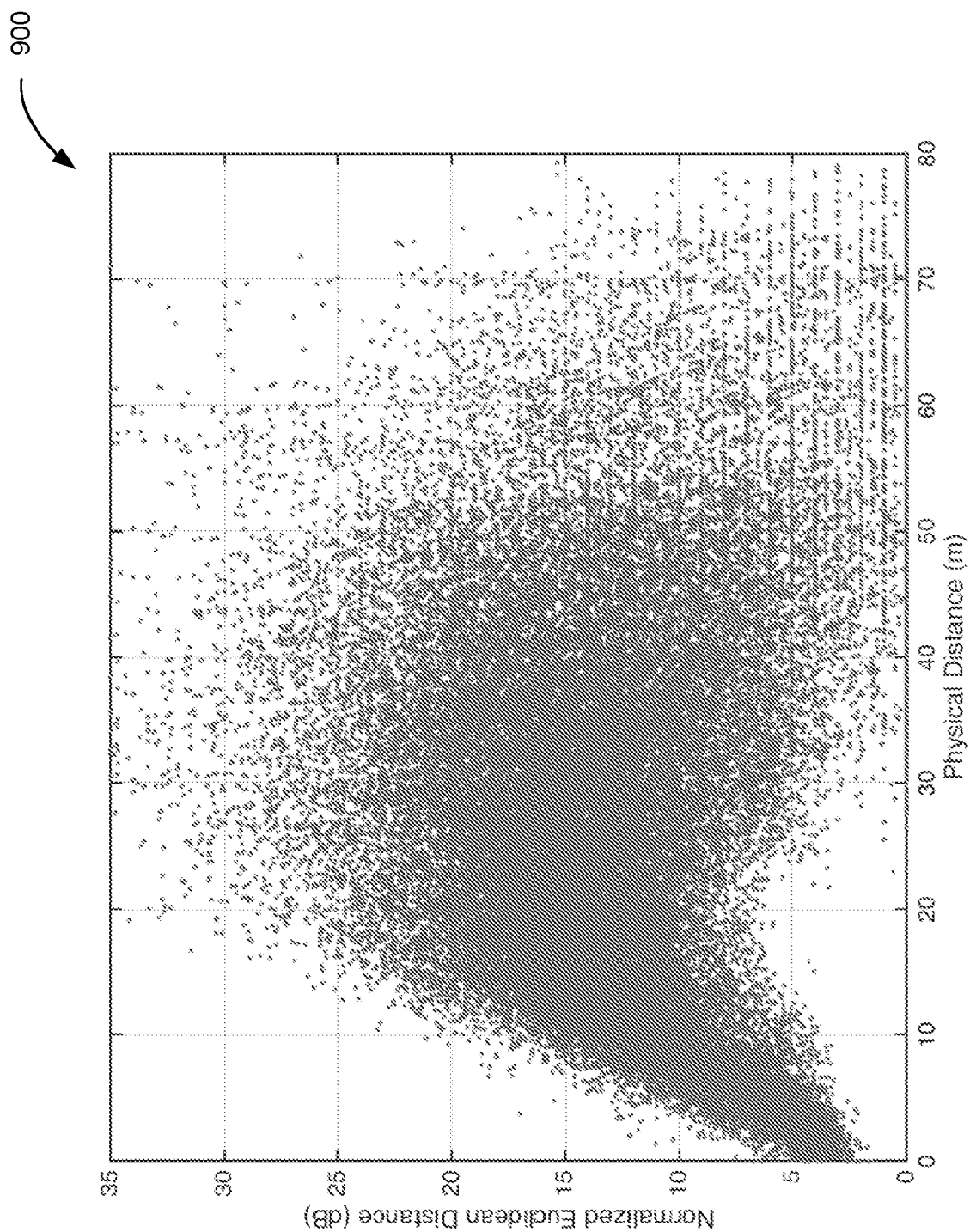
FIG. 9A is a chart of a plurality of sample points where each point represents a normalized Euclidean distance in units of dB measured at various physical distances according to embodiments of the present disclosure.

In some embodiments, the threshold distance may be selected based upon the correlation between measured values and physical distances. Having a correlation between measured values and physical distances may allow the mobile device to accurately determine the location of multi-dimensional data points for determining relative distances. FIG. 9A is a chart 900 illustrating a plurality of sample points where each point represents a normalized Euclidean distance in units of dB measured at various physical distances. The sample points may all have common device IDs, meaning the sample points are all measured from the same signal sources. The X-axis represents physical distance in meters that increases to the right, and the Y-axis represents normalized Euclidean distance in dB that increases upward. As illustrated in FIG. 9A, a linear correlation may be observed between a physical distance of 0 to 15 m. Thus, it would be suitable to select a threshold distance that is not greater than 15 m. This ensures that the measured Euclidean distance is monotonic throughout and linear in near-distance range.

Figure 9B:
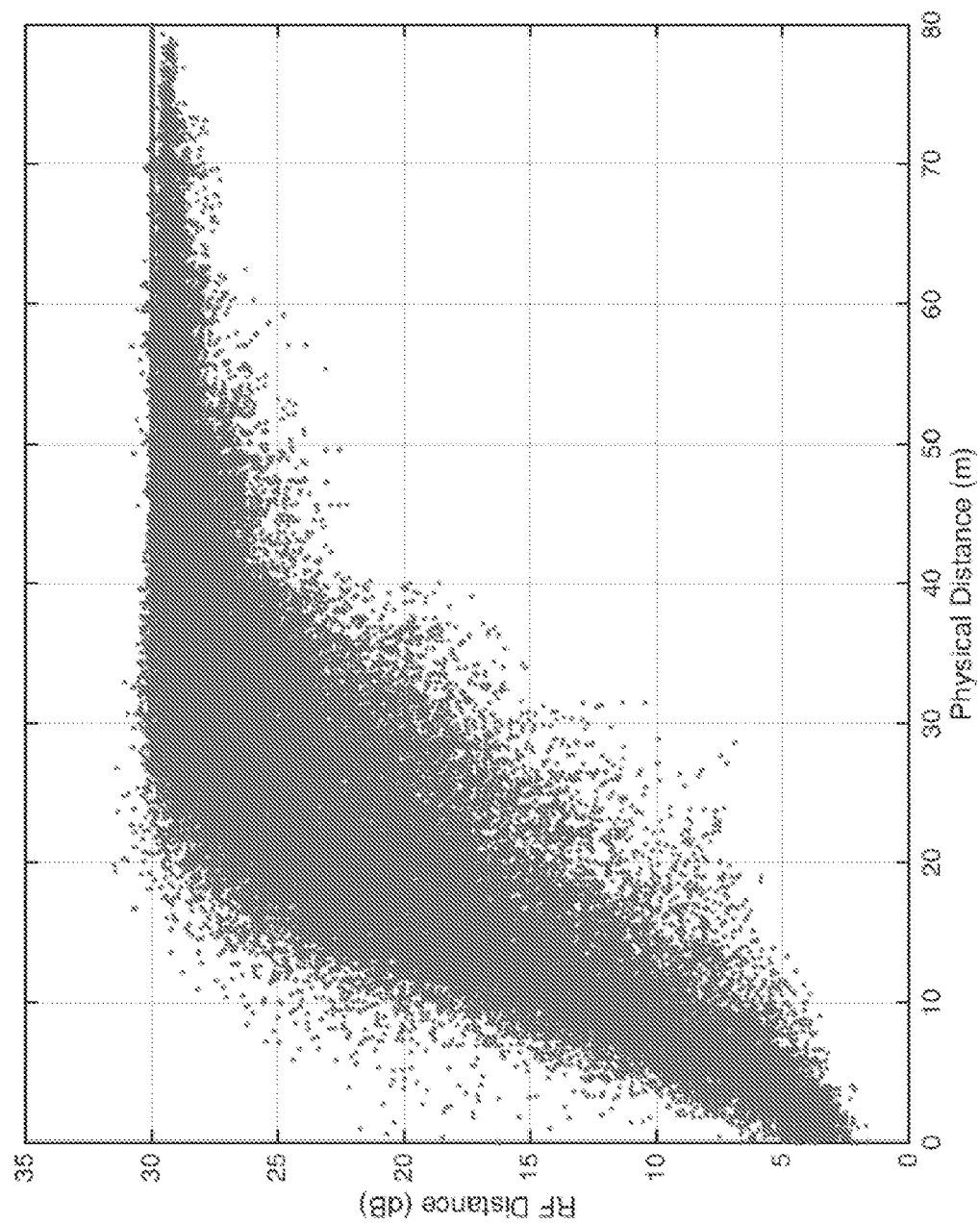
FIG. 9B is a chart of a plurality of sample points where each point represents a measured RF signal from a signal source at various physical distances from that signal source according to embodiments of the present disclosure.

If, however, having larger-sized clusters of multi-dimensional data points is desired, then larger threshold distances may be enabled if different types of sensor values are measured. For instance, threshold distances based upon a measured radio frequency (RF) value may enable the mobile device to apply larger threshold distances for sizing clusters of multi-dimensional data points. FIG. 9B is a chart 902 illustrating a plurality of sample points where each point represents a measured RF signal from a signal source at various physical distances from that signal source. The X-axis represents physical distance in meters that increases to the right, and the Y-axis represents RF distance in dB that increases upward. As shown in FIG. 9B, a linear correlation may be observed between a physical distance of 0 to 25 m. Thus, the threshold distance can be selected to be a distance no greater than 25 m when the multi-dimensional data points include sensor values in the form of RF measurements.

Figure 9C:
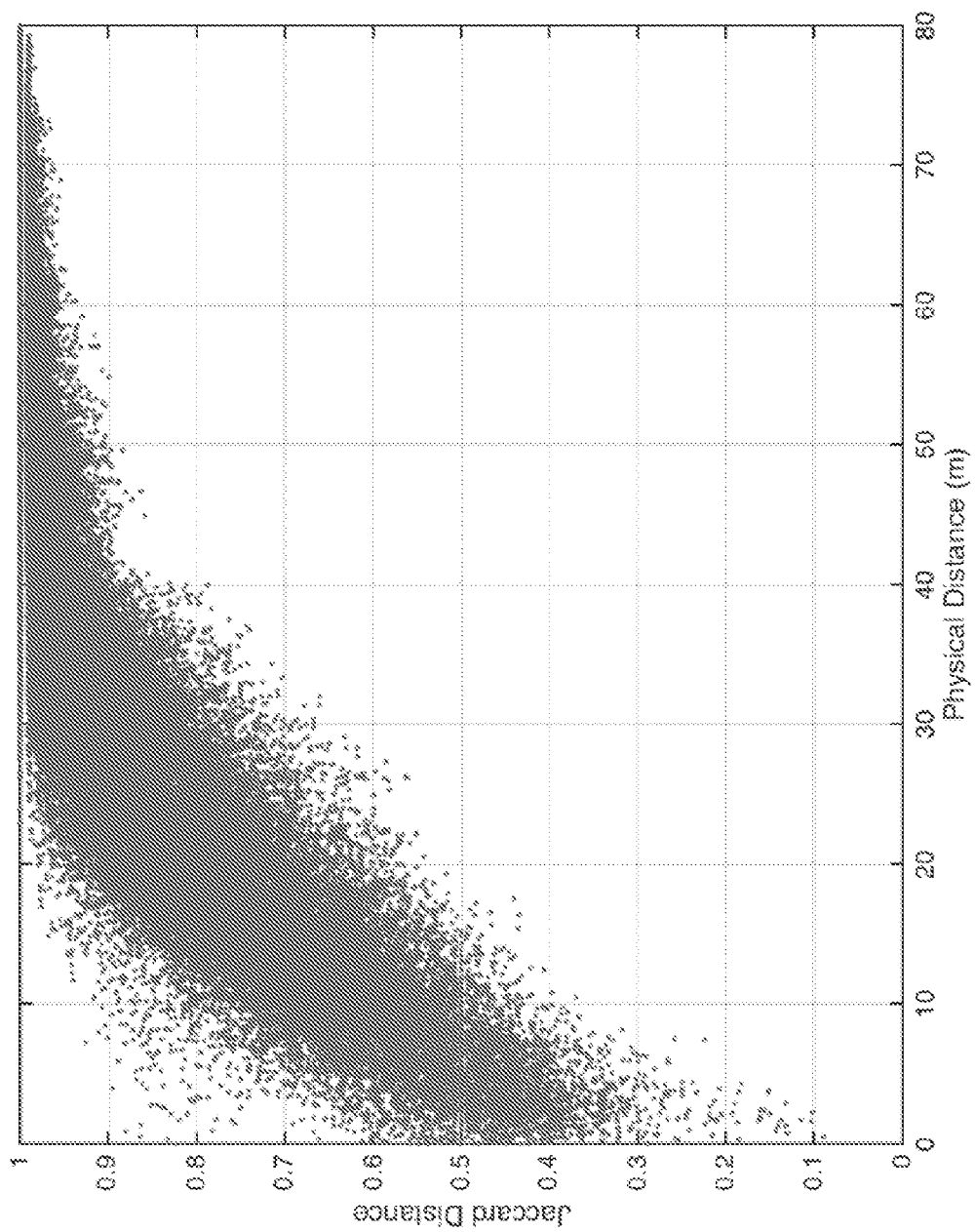
FIG. 9C is a chart of a plurality of sample points where each point represents a normalized Jaccard distance measured at various physical distances from that signal source according to embodiments of the present disclosure.

In yet other embodiments, even larger clusters of multi-dimensional data points may be enabled by measuring sensor values based upon a combination of signal strength and device ID, where the measured sensor values may be from different signal sources. In such embodiments, measured sensor values may not only include measured signal parameters (e.g., RSSi or TOF), but also the device ID associated with respective measured signal parameters. Including device ID as a part of the sensor values for a multi-dimensional data point allows the mobile device to distinguish between multi-dimensional data points based upon the devices from which signals are measured. For instance, if two data points do not have measurements from the same devices, then the mobile device may determine that the two locations from which the data points were measured are far apart. FIG. 9C is a chart 904 illustrating a plurality of sample points where each point represents a normalized Jaccard distance measured at various physical distances from that signal source. A Jaccard distance is a signal value that is a combination of a measured signal parameter and the device ID of the signal source emitting the signal from which the measured signal parameter is determined. The X-axis represents physical distance in meters that increases to the right, and the Y-axis represents normalized Jaccard distance that increases upward. As shown in FIG. 9C, a linear correlation may be observed between a physical distance of 0 to 40 m. Thus, the threshold distance can be selected to be a distance no greater than 40 m when the multi-dimensional data points include sensor values in the form of normalized Jaccard distances.

Figure 10A:
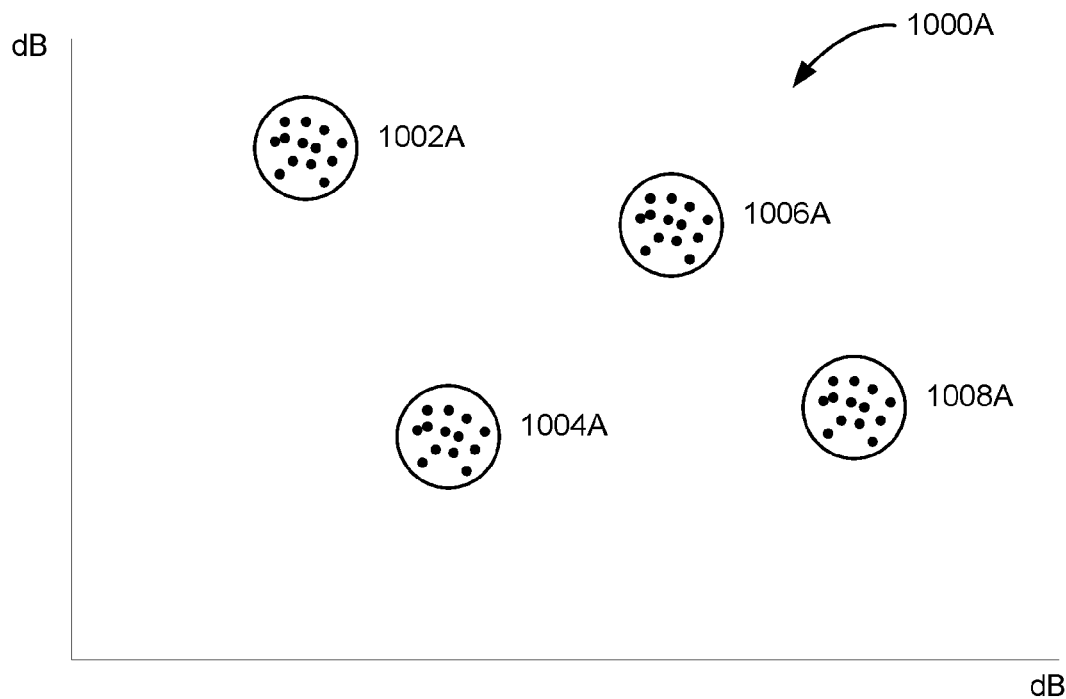
FIG. 10A is a chart representing clusters of sensor positions in sensor space according to embodiments of the present disclosure.
Figure 10B:
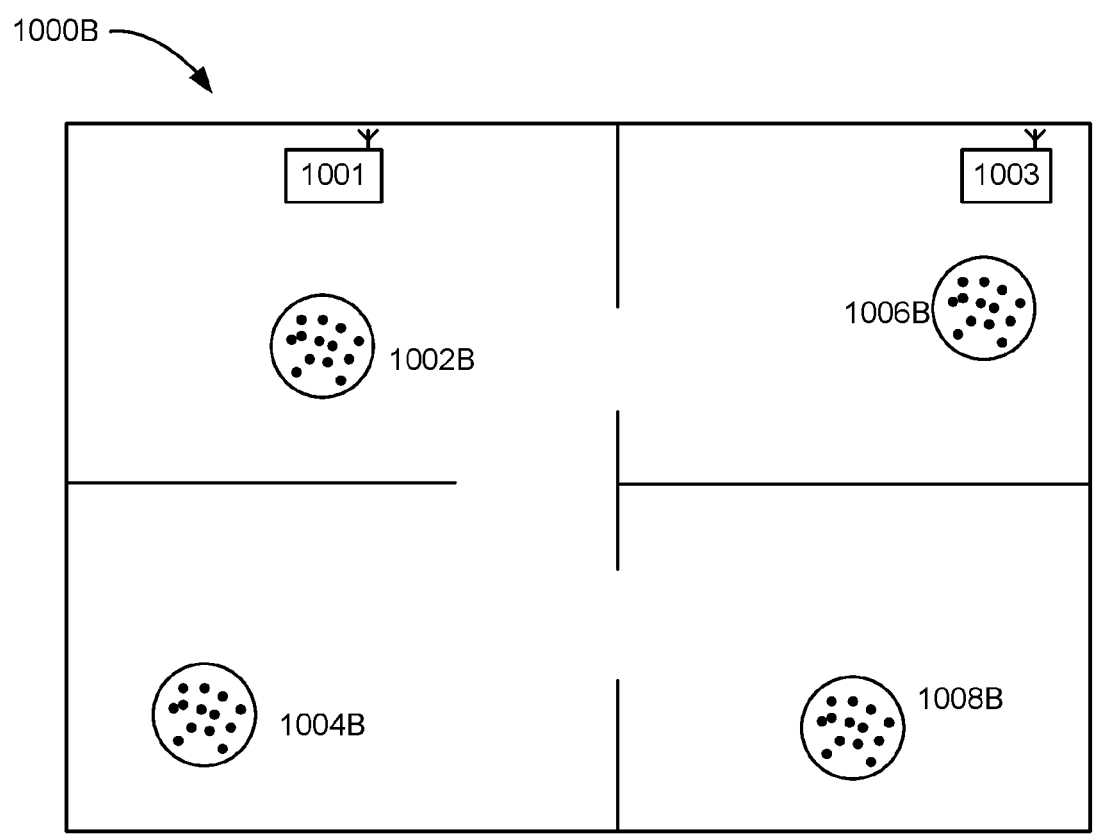
FIG. 10B is a simplified diagram illustrating clusters of sensor positions in physical space according to embodiments of the present disclosure.

FIG. 10A illustrates an exemplary cluster model 1000A built by a learning expert module according to embodiments of the present disclosure. Cluster model 1000A is a two dimensional model that reflects two signal sources 1001 and 1003 in an environment 1000B in FIG. 10B. In other words, cluster model 1000A shows clusters 1002A-1008A of the multi-dimensional data points in sensor space and environment 1000B shows the corresponding clusters 1002B-1008B of physical positions in physical space at which the multi-dimensional data points were measured.

In embodiments, individual clusters 1002A, 1004A, 1006A, and 1008A may be coordinate free locations, meaning the mobile device may not associate clusters 1002A, 1004A, 1006A, and 1008A with their physical locations. The mobile device may only know that there exists a cluster of multi-dimensional data points that have similar measured values and that the cluster represents a discrete physical location. For instance, cluster 1002A may correspond with cluster 1002B, which may be in a kitchen in environment 1000B, and cluster 1006A may correspond with cluster 1006B, which may be in a bedroom in environment 1000B.

Even though the mobile device may not have knowledge of each cluster's physical location, predictions may be performed solely based on clusters of multi-dimensional data points in sensor space. The mobile device may just know that a cluster represents a discrete location and assign it a generic identifier, such as location N where N is an integer. This simplifies and dramatically reduces the involvement of a user in performing application prediction based on a sensor position of the mobile device as compared to other methods that require a survey or a floor plan from the user.

According to embodiments of the present disclosure, the learning expert module may associate each cluster 1002A, 1004A, 1006A, and 1008A of multi-dimensional data points with one or more applications and its corresponding probability of being accessed by a user. As mentioned herein with respect to FIG. 4, sensor position database 420 may also identify which application was accessed by the user at each respective sensor position. The one or more applications and its corresponding probability may be calculated based upon the applications run by the user at each sensor position within the cluster. If a greater number of sensor positions are associated with a specific application, a greater probability may be assigned to that specific application. This information may be used to generate a set of evaluation rules to be used by a predictor module, such as sensor position predictor module 424D in FIG. 4.

Although embodiments herein do not need knowledge of an association between clusters of multi-dimensional data points in sensor space with multi-dimensional data points in physical space, having knowledge of this association may increase the accuracy of application predictions. Some ways to establish this association may be performed by gathering additional information, such as radar and motion detector data.

VI. Method of Determining Sensor Position of a Device

Figure 11:
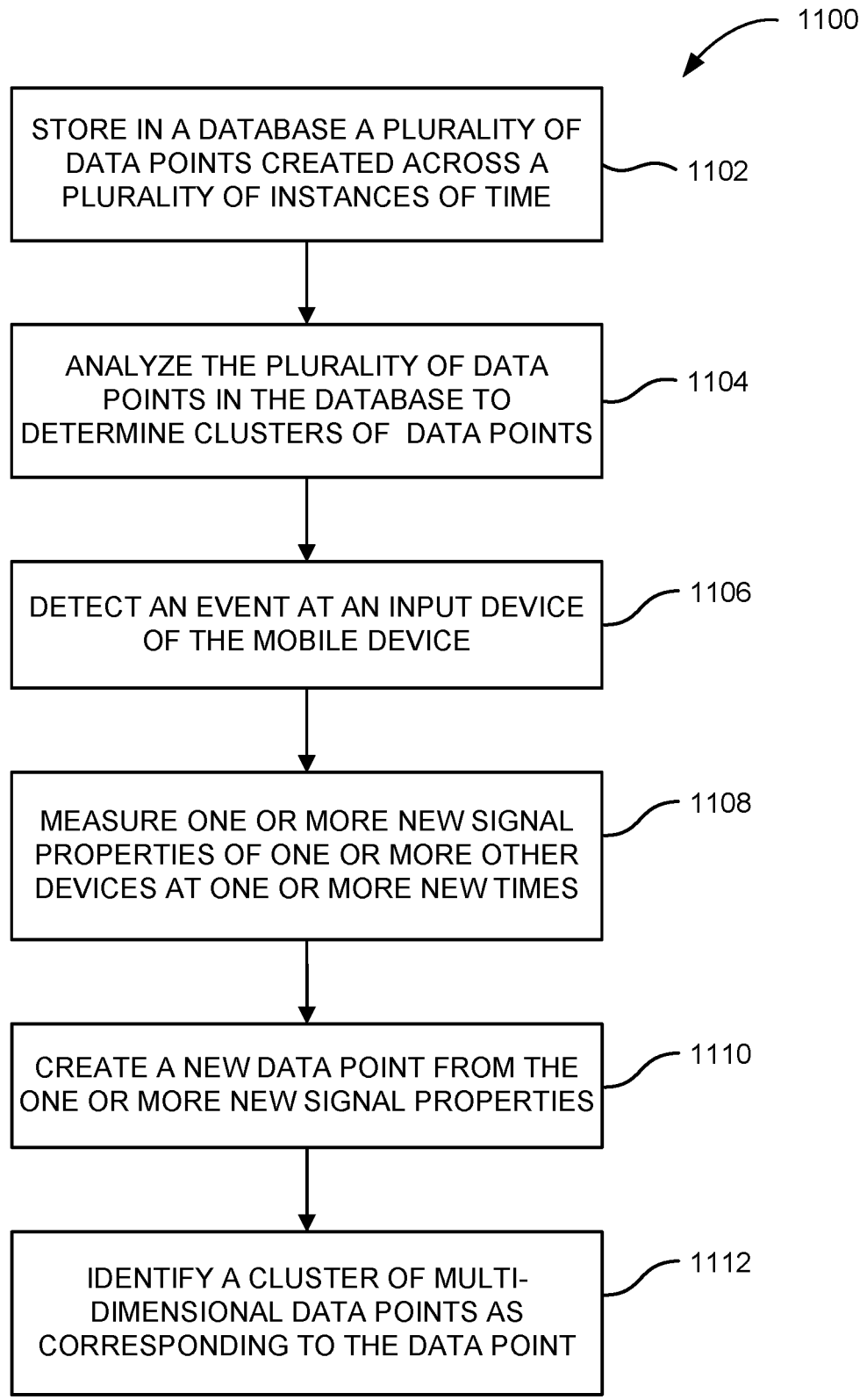
FIG. 11 is a flowchart for a method of determining a sensor position according to embodiments of the present disclosure

FIG. 11 is a flow chart illustrating an exemplary method 1100 of determining a sensor position of a mobile device, according to embodiments of the present disclosure. Method 1100 can use measurements of one or more signal properties to effectively determine that a mobile device is at a same physical location as it was during a previous usage of the mobile device, thereby determining a physical location of the mobile device.

At block 1102, a plurality of data points are stored in a database. The data points may be created at different instances of time, e.g., as discussed with respect to FIG. 7B. During each instance of time, one or more signal properties of one or more other devices (e.g., one or more network devices) may be measured across a time interval. As an example, an RSSI value and/or a time-of-flight may be measured across a time interval. Furthermore, an identifier may be obtained from each signal source. For instance, a MAC address, IP address, or any other identifier for identifying a signal source may be obtained. The one or more signal properties may be used to create a data point, which may then be stored in the database.

Each dimension of the data point can correspond to respective one of the other devices and a value for the dimension can corresponds to a signal property for that dimension. For example, if there are three other devices and one signal property is measured for each of the three other devices, each measured signal property would be a different dimension of the three-dimensional data point, and each measured signal property would correspond to one of the three devices. Even if two signal properties were measured from a same one of the three other devices, each of those two signal properties would correspond to one of two dimensions, each corresponding to that one device.

At block 1104, the plurality of data points in the database are analyzed to determine clusters of data points. The clusters of data points may be representative of areas where a mobile device is used often. The clustering may be performed as described herein, and may use clustering techniques known to one skilled in the art.

At block 1106, an event at an input device of the mobile device is detected. The input device may be any one of one or more input devices of the mobile device. The event may be a predetermined triggering event, as discussed herein with respect to FIG. 5. In various embodiments, the triggering event could be a learning triggering event or a prediction triggering event.

At block 1108, one or more new signal properties of one or more signal sources may be measured. The measurement may be performed at one or more new times, such as a current instance of time, and thus the newly measured signal properties can be considered new signal properties. The one or more new signal properties would correspond to the same type(s) of signal properties as previously measured and used to determine the clusters.

At block 1110, the new signal properties may be used to create a new data point. The new data point may represent a current sensor position of the mobile device in sensor space, as discussed herein.

At block 1112, a first cluster of data points is identified as corresponding to the new data point. It can be determined that the new data point is within the first cluster of data points, e.g., based on a distance of the new data point from a representative data point of the first cluster (e.g., a centroid of the first cluster). The first cluster of data points represents a discrete location of the mobile device in physical space, thereby allowing a determination of where the mobile device is located without requiring knowledge of an absolute physical location of the mobile device.

VII. Identifying Application Based on a Sensor Position of a Device

Figure 12:
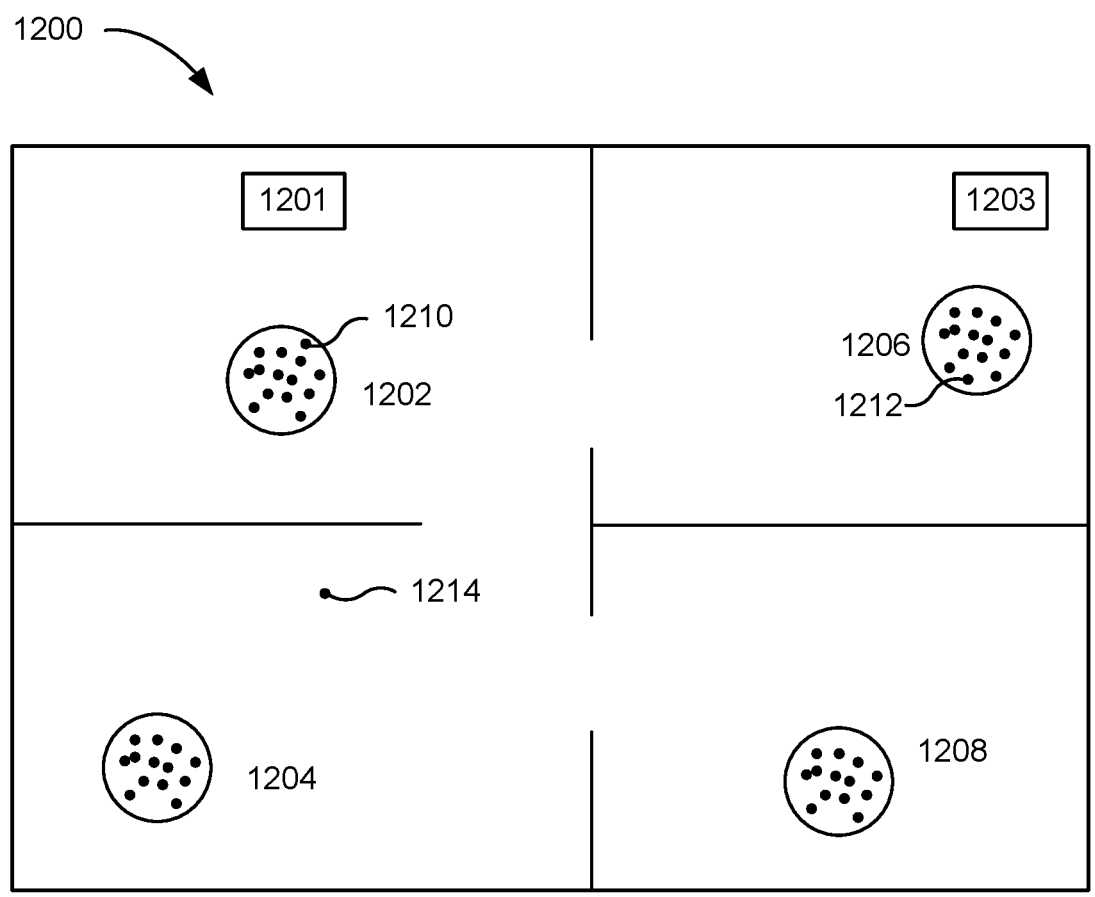
FIG. 12 is a simplified diagram illustrating clusters of sensor positions and new sensor positions for predicting applications based upon sensor positions according to embodiments of the present disclosure.

As mentioned herein, determining the sensor position of a mobile device can enable the mobile device to predict applications to a user. The sensor positions can be clustered together and then used to predict an application when a new sensor position is measured. FIG. 12 illustrates an exemplary use case for identifying an application based on a sensor position of a mobile device according to embodiments of the present disclosure. Environment 1200 with signal sources 1201 and 1203 and clusters 1202, 1204, 1206, and 1208 may be similar to environment 900B and clusters 902B, 904B, 906B, and 908B discussed in FIG. 9.

Each cluster 1202, 1204, 1206, and 1208 may be associated with one or more applications and probabilities of being accessed by the user. In embodiments, clusters 1202, 1204, 1206, and 1208 and their associated applications and probabilities may be used to determine a set of evaluation rules for a predictor module, e.g., sensor position predictor module 424D. If the mobile device measures that it is at a sensor position corresponding to physical position 1210, one or more applications and their probabilities associated with cluster 1202 may be suggested to the user. Likewise, if the mobile device measures that it is at a sensor position corresponding to physical position 1212, one or more applications and their probabilities associated with cluster 1206 may be suggested to the user. If, however, the mobile device measures that it is at a sensor position corresponding to physical position 1214, the mobile device may determine that it is not at a sensor position that is associated with a cluster. In such a situation, no application may be suggested to the user. If additional sensor positions that are subsequently measured have similar sensor values to physical position 1214, then a new cluster may be determined, e.g., by a learning expert module, as discussed herein.

Figure 13:
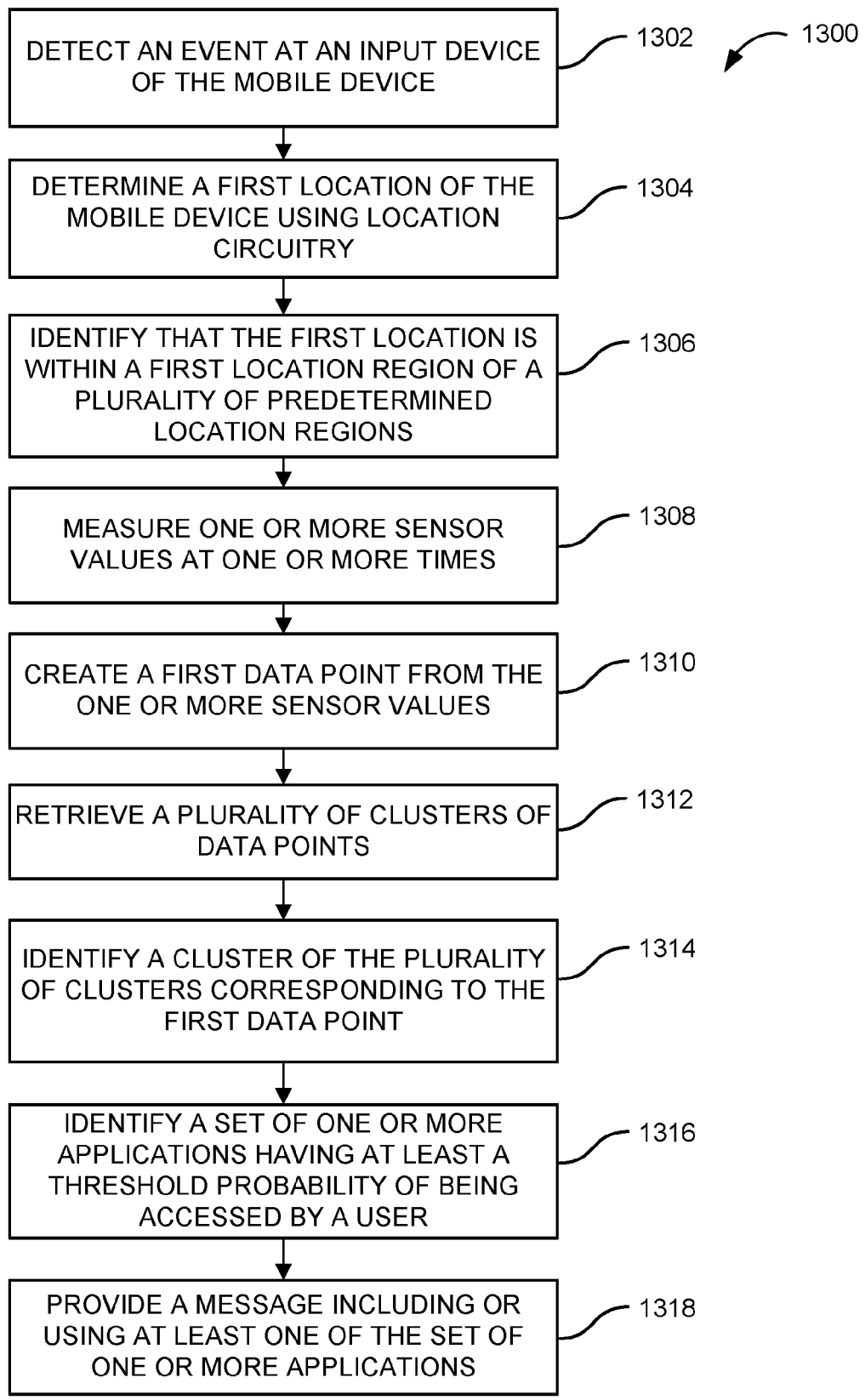
FIG. 13 is a flowchart for a method of predicting applications based upon a sensor position according to embodiments of the present disclosure.

FIG. 13 is a flowchart for a method 1300 of identifying an application based on a sensor position of a mobile device, according to embodiments of the present disclosure. Method 1300 can determine a predicted action for an application when the mobile device is at a predetermined location region, e.g., a user's home or office. Method 1300 can perform a dual level resolution analysis, e.g., as discussed herein with respect to FIG. 5

At block 1302, an event is detected at an input device of the mobile device. The input device may be any suitable device capable of generating a detection signal in response to an event, such as device connection events and user interaction events, respectively, as discussed herein with respect to FIG. 3. The event that is detected may be a predetermined triggering event, such as a prediction triggering event.

At block 1304, a first location of the mobile device is determined. The first location may be determined using location circuitry, such as location circuitry for generating information from GPS, Global Navigation Satellite System (GLONASS), BeiDou, Galileo, and Wi-Fi based positioning systems. The first location can be determined as a set of coordinates, such as latitude and longitude.

At block 1306, the first location is identified to be within a first location region of a plurality of predetermined location regions, as discussed herein with respect to FIGS. 5 and 6. The first location region may be a general location of the mobile device, such as a home or a workplace, as discussed herein with respect to FIGS. 5 and 6. Each predetermined location region may be a region within which a user spends a sufficient amount of time (e.g., 10 minutes) on a regular basis. Accordingly, the predetermined location region may be where the user is likely to initiate or utilize distinct functions of the mobile device at different locations within the general location, and thus require finer spatial resolution.

At block 1308, one or more sensor values are measured from one or more signals emitted by one or more signal sources. The sensor values may correspond to a property of one or more signals emitted from a signal source. In some embodiments, the one or more sensor values may be measured at one or more times, as discussed herein with respect to FIG. 7B. As various examples, the one or more sensor values can correspond to signal strength, time of flight of a signal, or intensity, e.g., for signals in the visible light spectrum being detected by an image sensor.

At block 1310, a first data point is created from the one or more measured sensor values. The data point may represent a sensor position of the mobile device in sensor space. In embodiments with a plurality of signal sources, each dimension of a multi-dimensional data point can correspond to one of the signal sources. More than one sensor value can be measured for each signal source, with each of the sensor values corresponding to a different dimension.

At block 1312, a plurality of clusters of data points corresponding to the first location region is retrieved. As an example, a plurality of clusters of data points stored in a database may be retrieved, as discussed herein with respect to FIG. 4. The retrieved clusters may correspond to measurements made at a user's home, when the home corresponds to the first location region. The plurality of clusters of data points may represent groupings of sensor positions stored from historical use of the mobile device. Accordingly, each cluster in the plurality of clusters can correspond to a discrete location within the first location region.

At block 1314, a first cluster of the plurality of clusters is identified as corresponding to the first data point, e.g., as discussed herein with respect to FIG. 11. The data point can correspond to a cluster based on a distance from a representative data point of a cluster, as is described herein.

At block 1316, a set of one or more applications having at least a threshold probability of being accessed by a user is identified. The set of one or more applications may be associated with a first cluster of data points, e.g., as discussed herein. The probability of an application being access can be defined with respect to the event occurring in association with the measured sensors values corresponding to the first cluster, e.g., based on historical usage of the mobile device at different sensor positions. The set of one or more applications can be determined using a set of one or more evaluation rules that are generated based on historical interactions of a user with the mobile device. The evaluation rules can be generated before the event is detected, e.g., in conjunction with a determination of the clusters, or after detection of the event. The evaluation rules can identify one or more applications with corresponding probabilities, which may correspond to particular usages of the application. Each set of evaluation rules can correspond to a different cluster.

At block 1318, a message including or using at least one of the set of one or more applications may be provided. The message may indicate to a user which application is recommended given the identified cluster of data points. As another example, the message can be provided to another device, e.g., so as to control another device. Such a control message can occur to turn off or on the other device, or change a setting.

VIII. Example Device

Figure 14:
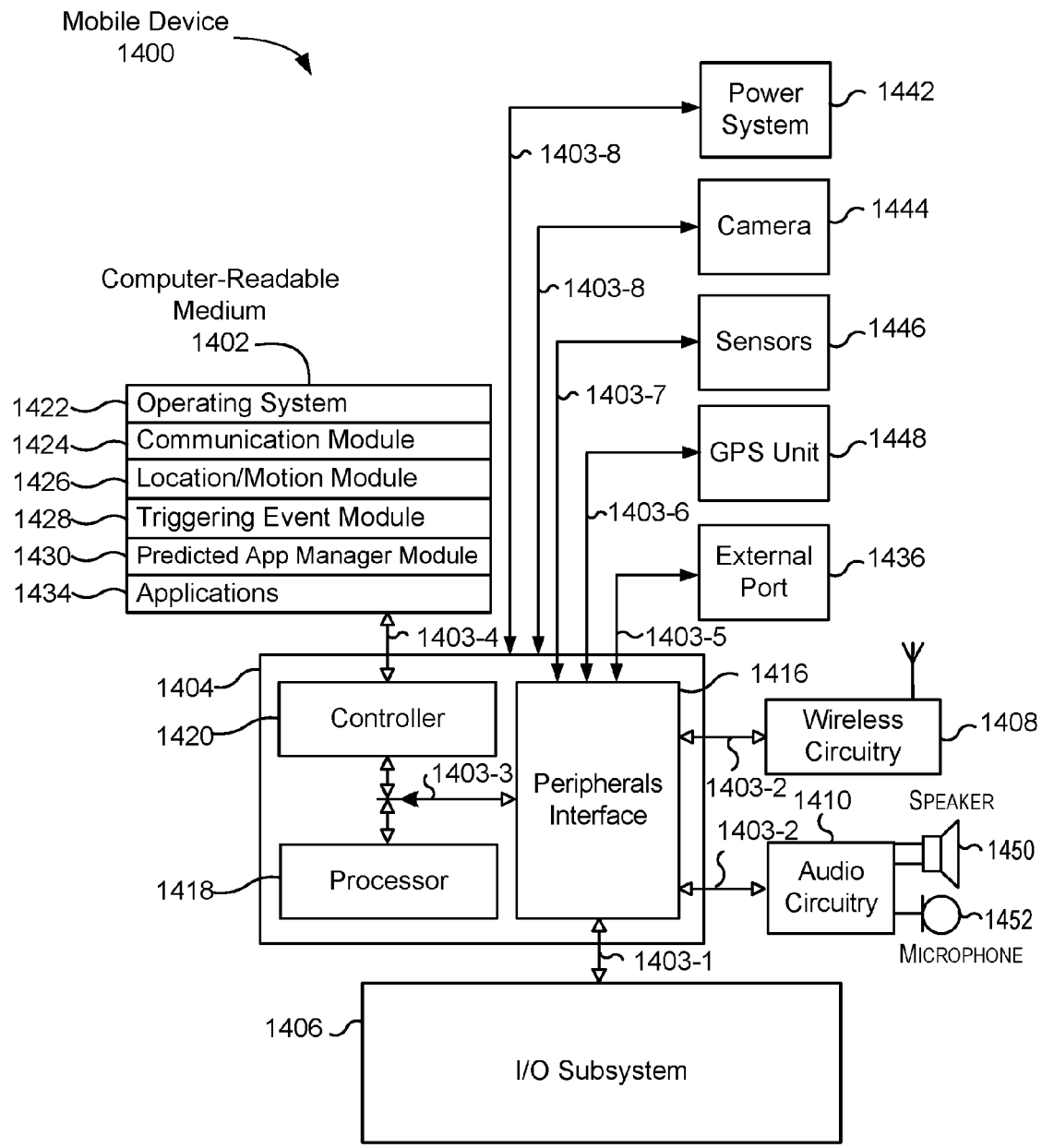
FIG. 14 is block diagram of an example device according to embodiments of the present disclosure.

FIG. 14 is a block diagram of an example device 1400, which may be a mobile device. Device 1400 generally includes computer-readable medium 1402, a processing system 1404, an Input/Output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1408 can use various protocols, e.g., as described herein.

Wireless circuitry 1408 is coupled to processing system 1404 via peripherals interface 1416. Interface 1416 can include conventional components for establishing and maintaining communication between peripherals and processing system 1404. Voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of the device to processor 1418 and computer-readable medium 1402. One or more processors 1418 communicate with computer-readable medium 1402 via a controller 1420. Computer-readable medium 1402 can be any device or medium that can store code and/or data for use by one or more processors 1418. Medium 1402 can include a memory hierarchy, including cache, main memory and secondary memory.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes a camera 1444. In some embodiments, device 1400 includes sensors 1446. Sensors 1446 can include accelerometers, compasses, gyrometers, pressure sensors, audio sensors, light sensors, barometers, and the like. Sensors 1446 can be used to sense location aspects, such as auditory or light signatures of a location.

In some embodiments, device 1400 can include a GPS receiver, sometimes referred to as a GPS unit 1448. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. In other embodiments, device 1400 may be configured to identify GLONASS signals, or any other similar type of satellite navigational signal.

One or more processors 1418 run various software components stored in medium 1402 to perform various functions for device 1400. In some embodiments, the software components include an operating system 1422, a communication module (or set of instructions) 1424, a location module (or set of instructions) 1426, a triggering event module 1428, a predicted app manager module 1430, and other applications (or set of instructions) 1434, such as a car locator app and a navigation app.

Operating system 1422 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., USB, FireWire, Lightning connector, 60-pin connector, etc.) is adapted for coupling directly to other devices or indirectly over a network (e.g., the Internet, wireless LAN, etc.).

Location/motion module 1426 can assist in determining the current position (e.g., coordinates or other geographic location identifier) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data.

Triggering event module 1428 can include various sub-modules or systems, e.g., as described herein with respect to FIG. 2A. Furthermore, predicted app manager module 1430 can include various sub-modules or systems, e.g., as described herein with respect to FIG. 3.

The one or more application programs 1434 on the mobile device can include any applications installed on the device 1400, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1406 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or track pad. In some embodiments, I/O subsystem 1406 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

What is claimed is:

1. A method for identifying a location of a mobile device, the method comprising:
 during each of a plurality of instances of time:
  measuring, by the mobile device, one or more signal properties of one or more other devices across a time interval;
  obtaining, by the mobile device, an identifier from each of the one or more other devices;

creating, by the mobile device, a data point to include the one or more signal properties, wherein each dimension of the data point corresponds to respective one of the one or more other devices and a value for the dimension corresponds to a signal property for that dimension; and storing, by the mobile device, the data point in a database of the mobile device, the database storing a plurality of data points corresponding to the plurality of instances of time;

analyzing, by the mobile device, the plurality data points in the database to determine clusters of data points, wherein different clusters of data points correspond to different locations in physical space;

after determining the clusters of data points, detecting, by the mobile device, an event at an input device of the mobile device;

in response to detecting the event, measuring, by the mobile device, one or more new signal properties of one or more of the plurality of other devices at one or more new times;

creating, by the mobile device, a new data point from the one or more new signal properties; and identifying, by the mobile device, a first cluster of the clusters of data points corresponding to the new data point by comparing the new data point with one or more data points in the first cluster and determining that the new data point is within a threshold distance of the one or more data points in the first cluster, thereby determining the location of the mobile device.

2. The method of claim 1, wherein the new data point is a multi-dimensional data point, each sensor value corresponding to a respective dimension of the first data point.

3. The method of claim 1, wherein the signal property is a signal strength of a signal emitted from a stationary device associated with the identifier.

4. The method of claim 3, wherein the signal property is data transmitted by the signal that is indicative of a distance between the mobile device and the stationary device.

5. The method of claim 1, wherein the one or more other devices comprise one or more network devices configured to emit wireless network communication signals of which the one or more signal properties are measured.

6. The method of claim 1, further comprising:
during each of the plurality of instances of time, associating the identifier with the one or more signal properties measured from the one or more other devices.

7. The method of claim 1, wherein the identifier is a MAC address, UUID, truncated UUID, Bluetooth device address, or an IP address.

8. The method of claim 1, wherein the one or more signal properties are signal properties of an emitted signal that changes with respect to a distance between the mobile device and the one or more other devices.

9. The method of claim 8, wherein the one or more signal properties include at least one of received signal strength indication (RSSI) and time-of-flight (TOF).

10. The method of claim 1, wherein a cluster of data points is determined by identifying data points that are within a threshold distance of each other.

11. The method of claim 10, wherein each of the clusters of data points in sensor space corresponds to a respective location in physical space.

12. The method of claim 1, further comprising suggesting an application to a user based on the location of the mobile device, wherein the application is associated with the first cluster.

13. A computer product comprising a non-transitory computer readable medium storing a plurality of instructions that when executed control a mobile device including one or more processors, the instructions comprising:
during each of a plurality of instances of time:
measuring, by the mobile device, one or more signal properties of one or more other devices across a time interval;
obtaining, by the mobile device, an identifier from each of the one or more other devices;
creating, by the mobile device, a data point to include the one or more signal properties, wherein each dimension of the data point corresponds to respective one of the plurality of other devices and a value for the dimension corresponds to a signal property for that dimension; and
storing, by the mobile device, the data point in a database of the mobile device, the database storing a plurality of data points corresponding to the plurality of instances of time;
analyzing, by the mobile device, the plurality of data points to determine clusters of the data points, wherein different clusters of data points correspond to different locations in physical space;
after determining the clusters, detecting, by the mobile device, an event at an input device of the mobile device;
in response to detecting the event, measuring, by the mobile device, one or more new signal properties of one or more of the plurality of other devices at one or more new times;
creating, by the mobile device, a new data point from the one or more new signal properties; and
identifying, by the mobile device, a first cluster of the clusters of data points corresponding to the new data point by comparing the new data point with one or more data points in the first cluster and determining that the new data point is within a threshold distance of the one or more data points in the first cluster, thereby determining the location of the mobile device.

14. The computer product of claim 13, wherein the signal property is a signal strength of a signal emitted from a stationary device associated with the identifier.

15. The computer product of claim 14, wherein the signal property is data transmitted by the signal that is indicative of a distance between the mobile device and the stationary device.

16. The computer product of claim 13, wherein the one or more other devices comprise one or more network devices configured to emit wireless signals.

17. A mobile device comprising:
a database for storing data points;
one or more input devices; and
one or more processors configured to:
during each of a plurality of instances of time:
measure one or more signal properties of one or more other devices across a time interval;
obtain an identifier from each of the one or more other devices;
create a data point to include the one or more signal properties, wherein each dimension of the data point corresponds to respective one of the plurality of other devices and a value for the dimension corresponds to a signal property for that dimension; and store the data point in the database of the mobile device, the database storing a plurality of data points corresponding to the plurality of instances of time;

analyze the plurality of data points to determine clusters of the data points, wherein different clusters of data points correspond to different locations in physical space;

after determining the clusters, detect an event at one of the one or more input devices of the mobile device;

in response to detecting the event, measure one or more new signal properties of one or more of the plurality of other devices at one or more new times;

create a new data point from the one or more new signal properties; and identify a first cluster corresponding to the new data point by comparing the new data point with one or more data points in the first cluster and determining that the new data point is within a threshold distance of the one or more data points in the first cluster, thereby determining the location of the mobile device.

18. The mobile device of claim 17, wherein the signal property is a signal strength of a signal emitted from a stationary device associated with the identifier.

19. The mobile device of claim 18, wherein the signal property is data transmitted by the signal that is indicative of a distance between the mobile device and the stationary device.

* * * * *